United States Patent
Coates et al.

(10) Patent No.: US 9,365,674 B2
(45) Date of Patent: Jun. 14, 2016

(54) POLYETHERS, METHODS OF MAKING SAME, AND USES THEREOF

(75) Inventors: Geoffrey W. Coates, Lansing, NY (US); Peter C. B. Widger, Nashua, NH (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 14/122,407

(22) PCT Filed: May 31, 2012

(86) PCT No.: PCT/US2012/040165
§ 371 (c)(1),
(2), (4) Date: Feb. 12, 2014

(87) PCT Pub. No.: WO2012/166889
PCT Pub. Date: Dec. 6, 2012

(65) Prior Publication Data
US 2014/0179895 A1    Jun. 26, 2014

Related U.S. Application Data

(60) Provisional application No. 61/491,704, filed on May 31, 2011.

(51) Int. Cl.
| | |
|---|---|
| C08G 65/26 | (2006.01) |
| C08G 65/10 | (2006.01) |
| C08G 65/12 | (2006.01) |
| C08G 18/48 | (2006.01) |
| C08L 71/02 | (2006.01) |
| C08L 75/04 | (2006.01) |

(52) U.S. Cl.
CPC ........ *C08G 65/2609* (2013.01); *C08G 18/4825* (2013.01); *C08G 65/266* (2013.01); *C08G 65/2606* (2013.01)

(58) Field of Classification Search
CPC ...................................... C08G 65/26
USPC ................................. 528/405, 425
See application file for complete search history.

(56) References Cited

U.S. PATENT DOCUMENTS

| | | |
|---|---|---|
| 7,399,822 B2 | 7/2008 | Coates et al. |
| 2010/0120996 A1 | 5/2010 | Tokunaga et al. |
| 2010/0144969 A1 | 6/2010 | Coates et al. |

FOREIGN PATENT DOCUMENTS

| | | |
|---|---|---|
| WO | 2008/024363 A2 | 2/2008 |
| WO | 2010/028362 A1 | 3/2010 |

OTHER PUBLICATIONS

Widger, P.C.B., et al., Isospecific polymerization of racemic epoxides: a catalyst systme for the synthesis of highly isotactic polyethers, Chemical Communication, Mar. 22, 2010, vol. 46, pp. 2935-2937.

Thomas, R.M., et al., Enantioselective Epoxide Polymerization Using a Bimetallic Cobalt Catalyst, Journal of the American Chemical Society, Nov. 2, 2010, vol. 132, pp. 16520-16525.

*Primary Examiner* — Duc Truong
(74) *Attorney, Agent, or Firm* — Hodgson Russ LLP

(57) ABSTRACT

Isotactic polyethers, methods of making polyethers, and uses of polyethers. The polyethers have a chain transfer group formed from a chain transfer agent. The methods of making the polyethers use monoalcohol chain transfer agents or multifunctional chain transfer agents. The polyethers can be used in materials, such as polyurethanes, elastomers, thermoset plastics, and thermoplastics, and as non-ionic surfactants.

20 Claims, 17 Drawing Sheets

POLYETHERS, METHODS OF MAKING SAME, AND USES THEREOF

CROSS-REFERENCE TO RELATED APPLICATIONS

This application claims priority to U.S. provisional patent application No. 61/491,704, filed May 31, 2011, the disclosure of which is incorporated herein by reference.

STATEMENT REGARDING FEDERALLY SPONSORED RESEARCH

This invention was made with government support under grant no. CHE0809778 awarded by the National Science Foundation. The government has certain rights in the invention.

FIELD OF THE INVENTION

The present invention generally relates to polyethers. More particularly, the invention relates to isotactic polyethers.

BACKGROUND OF THE INVENTION

Enantiomerically pure polymers are valuable due to their optically active properties for uses ranging from materials science to synthetic organic chemistry. These polymers can be prepared by the polymerization of enantiomerically pure monomers. However, most enantiomerically pure monomers are difficult and/or expensive to prepare compared to their racemic counterparts, such that polymerization of enantiomerically pure monomers is not a realistic option.

End-functionalized polymers with controlled molecular weight (MW) and microstructure are valuable building blocks for materials scientists but are challenging to synthesize. The reactive terminal groups of end-functionalized polymers allow for their integration in complex materials such as drugs or biomolecule conjugates, modified solid surfaces, or block copolymers. For example, over 4 million tons of end-functionalized poly(propylene oxide) (PPO) polyols are synthesized annually for use as mid-blocks in polyurethane synthesis. Polyurethanes are an important class of polymers used as adhesives, elastomers, fabrics, foams and insulators, whose properties are largely determined by the structure and properties of the polyols used in their synthesis. Currently, linear di-end-functionalized (telechelic) PPO diols are popular mid-segments for polyurethanes due to their low cost and desirable properties.

BRIEF SUMMARY OF THE INVENTION

In an aspect, the present invention provides isotactic polyethers. For example, the isotactic polyether is isotactic polypropylene.

In an embodiment, the polymer has the following structure:

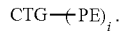

CTG is a chain transfer group and PE is an isotactic polyether group, and i is from 1 to 10. The polymer has an mm-triad content greater than 75% and the $M_n$ of the polymer is from 1,000 to 40,000 g/mol.

In an aspect, the present invention provides methods of making isotactic polyethers. The methods use monoalcohol chain transfer agents or multifunctional chain transfer agents.

In an embodiment, the method for making isotactic polyethers comprises the steps of: polymerizing an epoxide in the presence of a catalyst, an ionic co-catalyst, and a monoalcohol chain transfer agent or multifunctional chain transfer agent. For example, the catalyst is a cobalt salenate complex.

In an aspect, the present invention provides materials comprising a polyether of the instant invention. For example, the materials are polyurethanes, elastomers, thermoset plastics, or thermoplastic polymers.

DETAILED DESCRIPTION OF THE INVENTION

Figure 1:
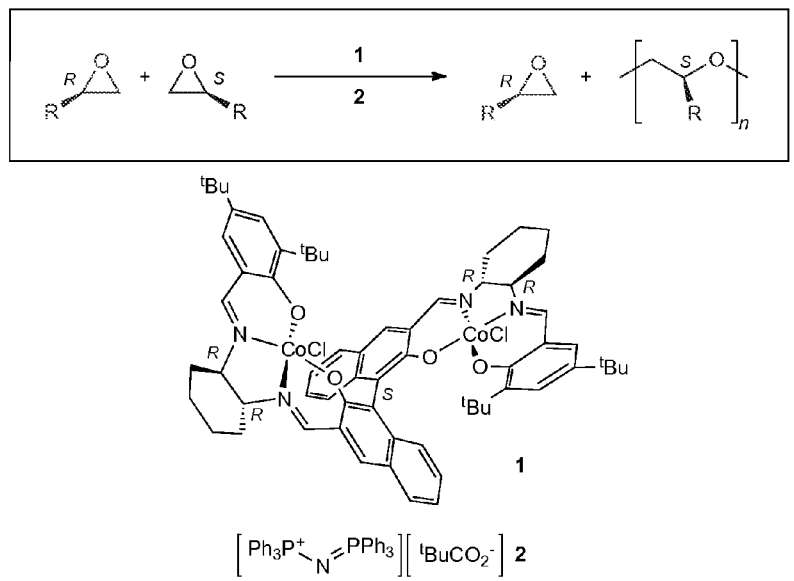
FIG. 1. Example of enantioselective polymerization of epoxides using 1/2.
Figure 2:
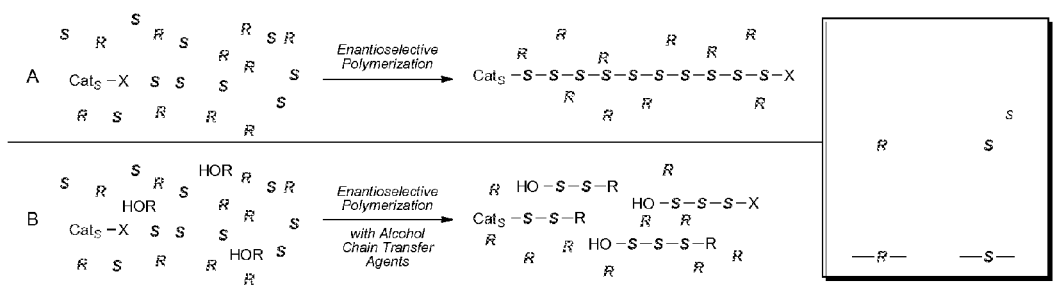
FIG. 2. Example of enantioselective epoxide polymerization using catalyst system 1/2. A) aithout added alcohols B) with alcohols as chain transfer agents (CTAs).

The present invention provides polyethers (e.g., poly(propylene oxide) (PPO)), methods of making such polymers, and uses of such polymers. The polymers are isotactic. The methods of making the polyethers use a monoalcohol chain transfer agent or a multifunctional chain transfer agent.

The present invention is based on the surprising result that catalyst/co-catalyst system used to synthesize isotactic polyethers can control molecular weight (MW) and end-groups of the polyethers. For example, isotactic poly(propylene oxide) polymers can be formed from racemic poly(propylene oxide) (PPO).

As used herein, unless otherwise expressly stated, "aliphatic" refers to branched or unbranched hydrocarbons and is meant to include alkanes, alkenes, and alkynes. For example, the aliphatic group is a C$_1$ to C$_{20}$ aliphatic group. The aliphatic group can be a alkyl group such as a methyl group, ethyl group, n-propyl group, i-propyl group, n-butyl group, i-butyl group, s-butyl group, pentyl group, hexyl group, nonyl group, or decyl group. The aliphatic group can be unsubstituted or substituted with groups such as halides (—F, —Cl, —Br, and —I), alkenes, alkynes, aliphatic groups, aryl groups, alkoxides, carboxylates, carboxylic acids, and ether groups.

As used herein, unless otherwise expressly stated, "carbocyclic group" refers to a cyclic compound having a ring in which all of the atoms forming the ring are carbon atoms. The carbocyclic group can be aromatic or nonaromatic, and include compounds that are saturated, partially unsaturated, or fully unsaturated. The carbocyclic group can contain one or more rings. Examples of such groups include phenyl, substituted phenyl rings (aryl, halides, alkyl chains in the ortho position, meta position, para position, or combinations thereof), and carbocyclic (e.g., hexyl and pentyl). For example, the carbocyclic ring is a C$_3$ to C$_{12}$ carbocyclic ring, including all integer numbers of carbons and ranges of numbers of carbons therebetween. The carbocyclic ring can be unsubstituted or substituted with groups such as, halides (—F, —Cl, —Br, —I), alkenes, alkynes, aliphatic groups, aryl groups, alkoxides, carboxylates, carboxylic acids, and ether groups. As used herein, unless otherwise expressly stated, "aryl group" refers to a "carbocyclic group" that is aromatic. The aryl group can be substituted in the same manner as the carbocyclic group.

As used herein, unless otherwise expressly stated, "heteroaliphatic group", refers to a hydrocarbon moiety that can be linear or branched and may be completely saturated or may contain one or more units of unsaturation and contains at least one heteroatom selected from the group consisting of sulfur, nitrogen, and oxygen. Unless otherwise specified, heteroaliphatic groups contain 1 to 12 carbon atoms. Suitable heteroaliphatic groups include halides (—F, —Cl, —Br, —I), alkenes, alkynes, aliphatic groups, aryl groups, alkoxides, carboxylates, carboxylic acids, and ether groups.

As used herein, unless otherwise expressly stated, "heterocyclic group" refers to a cyclic compound having one or more rings where at least one of the atoms forming the ring(s) is a heteroatom (e.g., O, N, S, etc.). The heterocyclic group can be aromatic or nonaromatic, and include compounds that are saturated, partially unsaturated, and fully unsaturated. For example, the heterocyclic group is a C$_3$ to C$_{12}$ heterocyclic group, including all integer numbers of carbons and ranges of numbers of carbons therebetween. The heterocyclic ring can be unsubstituted or substituted with groups such as, for example, halides (—F, —Cl, —Br, —I), alkenes, alkynes, aliphatic groups, aryl groups, alkoxides, carboxylates, carboxylic acids, and ether groups. As used herein, unless otherwise expressly stated, "heteroaryl group" refers to a "heterocylic group" that is aromatic. The heteroaryl group can be substituted in the same manner as the heterocyclic group.

As used herein, unless otherwise expressly stated, "alkoxide group" refers to the anion of an alcohol group.

As used herein, unless otherwise expressly stated, "carboxylate group" refers to the anion of a carboxylic acid.

In an aspect, the present invention provides polyethers. As used herein, "polyether" refers to polymers and polymer groups that contain a plurality of ether linkages formed from ring opened epoxides and contain a chain transfer group formed from a chain transfer agent (e.g., the polymer group and chain transfer group forming ether or ester linkages). The polyether polymer can terminate in an alcohol or ether linkage. For example, the polyether is polypropylene.

The invention provides a polyether polymer having the following structure:

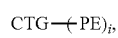

where CTG is a monoalcohol chain transfer group or multifunctional chain transfer group derived from a chain transfer agent, PE is an isotactic polyether group, which is the ring opened polymerized forms of the epoxides, and i is from 1 to 10, including all integer values and ranges therebetween.

CTGs are derived from chain transfer agents CTAs. For example, a diol CTA gives a diol CTG:

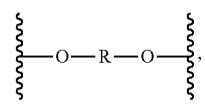

a monoalcohol CTA gives a monoalcohol CTG:

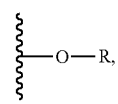

a diacid CTA gives a diacid CTG:

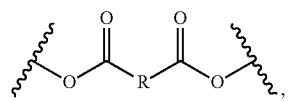

and a hydroxyacid CTA gives a hydroxyacid CTG:

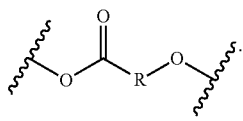

In an embodiment, the terminal groups of the polymer are secondary alcohols. For example, in the case of a bifunctional chain transfer agent, both terminal groups of the polymer are secondary alcohols.

In an embodiment, the invention provides a polyether polymer having the following structure:

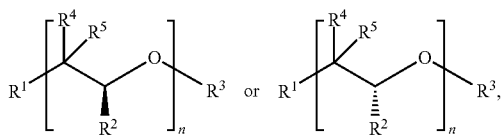

where $R^1$ is

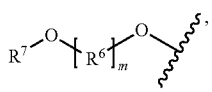

$R^2$ is a H or $C_1$ to $C_{20}$ aliphatic group, including all integer numbers of carbons and ranges therebetween, or a $C_6$ to $C_{20}$ aryl containing group, including all integer numbers of carbons and ranges therebetween, $R^3$ is H or $C_1$ to $C_{20}$ aliphatic group, including all integer numbers of carbons and ranges therebetween, $R^4$ is H or a $C_1$ to $C_{20}$ aliphatic group, including all integer numbers of carbons and ranges therebetween, $R^5$ is H or a $C_1$ to $C_{20}$ aliphatic group, including all integer numbers of carbons and ranges therebetween. Optionally, any two of $R^4$, $R^5$, and $R^2$ taken together can form with their intervening atoms can form one or more rings selected from the group consisting of: $C_3$ to $C_{14}$ carbocyclic group, $C_3$ to $C_{14}$ heterocyclic group, $C_6$ to $C_{10}$ aryl group, and $C_5$ to $C_{10}$ heteroaryl group. $R^6$ is $C_2$ to $C_{20}$ aliphatic group, including all integer numbers of carbons and ranges therebetween, $C_3$ to $C_{20}$ carbocyclic group, including all integer numbers of carbons and ranges therebetween, $C_6$ to $C_{24}$ aryl group, including all integer numbers of carbons and ranges therebetween,

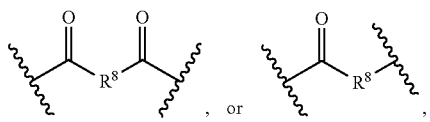

$R^2$ is H,

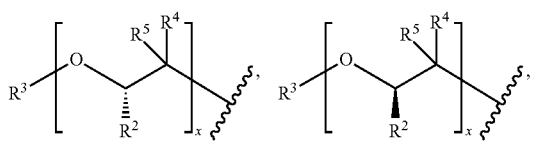

or $C_1$ to $C_{20}$ aliphatic group, including all integer numbers of carbons and ranges therebetween, $R^8$ is absent or $C_1$ to $C_{20}$ aliphatic group, including all integer numbers of carbons and ranges therebetween, n is from 5 to 500, including all integers and ranges therebetween, m is from 1 to 500, including all integers and ranges therebetween, and x is from 5 to 500, including all integers and ranges therebetween. The groups can be optionally substituted.

The polyethers of the present invention are isotactic. For example, the PPO polymers can have an mm-triad content is greater than 75%, 80%, 85%, 90%, 91%, 92%, 95%, 96%, 97%, 98%, or 99%. The isotacticity (e.g., mm-triad content) of the polymers can be determined by $^{13}C$ NMR spectroscopy. In an embodiment, the polyethers have an mm-triad content greater than 90% as determined by $^{13}C$ NMR spectroscopy. In an embodiment, the polyethers have an mm-triad content of 100%.

The polyethers can have a range of selectivity factors (s-factors). The s-factor describes the steroselectivity of one enantiomer of the catalyst choosing the preferred enantiomer of the monomer.

The polyethers can have a range of PDI values. For example, the polymers can have a PDI of less than 2. In various examples, the PDI of the polymer is less than 1.8, is less than 1.6, or less than 1.5.

The polyethers can have a range of $M_n$ values. For example, the $M_n$ of the polymer is in the range of 1,000 to 40,000 g/mol, including all values to the 10 g/mol and ranges therebetween. In various examples, the $M_n$ of the polymer is in the range of 1,000 to 30,000, 1,000 to 15,000, or 1,000 to 12,000 g/mol.

The polyethers of the present invention can have desirable properties. For example, these polymers can be highly isotactic and semicrystalline or crystalline and have higher resistance to thermal deformation.

In an aspect, the present invention provide methods for making polyethers. The methods use monoalcohol chain transfer agents or multifunctional chain transfer agents to provide polyethers of the instant invention. In an embodiment, the polyethers are produced by a method disclosed herein.

In an embodiment, a method for making a polyether polymer comprises the steps of: polymerizing an epoxide in the presence of a catalyst, an ionic co-catalyst, and a monoalcohol chain transfer agent or multifunctional chain transfer agent (CTA). For example, the invention uses diols as chain transfer agents with a catalyst to synthesize end-functionalized isotactic polyethers including telechelic diols from racemic epoxides. Telechelic diols are an important component of polyurethanes.

The method can proceed to varying degrees of conversion. In various examples, the method of forming the polyethers is allowed to proceed to at least 30%, 35%, 40%, 45%, 50%, 55%, 60%, 65%, 70%, 75%, 80%, 85%, 90%, 95%, or 100% conversion before being quenched.

In an embodiment, the polymerization is a kinetic resolution method. In this embodiment, in addition to the steps of the methods described herein where a mixture of epoxide enantiomers is used, the kinetic resolution method further comprises the step of recovering unreacted epoxide, wherein the recovered epoxide is enantiomerically enriched. For example, the recovered the enantiomeric excess of recovered epoxide is greater than 50%. In various examples, the enantiomeric excess of recovered epoxide is greater than 75%, 80%, 85%, 90%, 95%, 97%, 98%, or 99%. The enantiomeric excess (% ee) can be measured by methods known in the art. For example, the enantiomeric excess is measured by $^1H$ NMR spectroscopy.

The epoxides used in the method can be achiral (i.e., racemic or prochiral) or chiral. In an embodiment, the epoxides of the method can have the following formula:

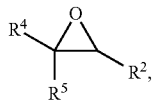

where, $R^2$ is a H or $C_1$ to $C_{20}$ aliphatic group, including all integer numbers of carbons and ranges therebetween, $R^4$ is H or a $C_1$ to $C_{20}$ aliphatic group, including all integer numbers of carbons and ranges therebetween, $R^5$ is H or a $C_1$ to $C_{20}$ aliphatic group, including all integer numbers of carbons and ranges therebetween. In an embodiment, optionally, any two of $R^4$, $R^5$, and $R^2$ taken together can form with their intervening atoms can form one or more rings selected from the group consisting of: optionally substituted $C_3$ to $C_{14}$ carbocyclic group, optionally substituted $C_3$ to $C_{14}$ heterocyclic group, optionally substituted $C_6$ to $C_{10}$ aryl group, and optionally substituted $C_5$ to $C_{10}$ heteroaryl group. In an embodiment, the epoxide can have the following structure:

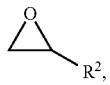

where $R^2$ is as defined herein. For example, $R^2$ can be a methyl group, ethyl group, $CH_2OMe$, $CH_2OPh$, $CF_3$, or $CH_2Cl$. In an example, the epoxide is

or a combination thereof.

The epoxides can be prepared by known synthetic methods. Suitable epoxides are commercially available. Examples of suitable epoxides include propylene oxide, glycidyl ethers, and halogen substituted epoxides such as

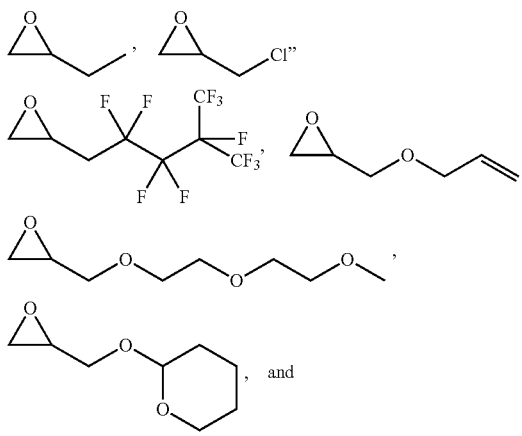

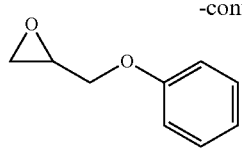

The epoxide can be present as mixtures of stereoisomers, where the mixture is, enriched in one stereoisomer relative the complementary stereoisomer (also referred to as an optically enriched form of the epoxide) and racemic mixtures of epoxide. In various examples, the epoxide can be present as a mixture of stereoisomers having greater than 90, 95, 99, 99.5, or 99.9% purity of one stereoisomer. In another example, optically pure (no detectable complementary stereoisomer present) epoxide is used. Optical purity can be determined by methods known in the art, for example, HPLC, GC, or nuclear magnetic resonance spectroscopy. Use of optically pure epoxide or optically enriched epoxide present as a mixture of epoxides, e.g., greater than 90% enrichment, in a stereoisomer in the methods described herein can result in formation of polymers having desirable properties.

In an example, the epoxide is present in large excess of all of the other components in the reaction mixture. In certain embodiments, any of the above methods comprise a ratio of 500:1 to 500,000:1 of epoxide to catalyst and all ratios therebetween. In certain embodiments, any of the above methods comprise a ratio of 500:1 to 100,000:1 of epoxide to catalyst. In certain embodiments, any of the above methods comprise a ratio of 500:1 to 50,000:1 of epoxide to catalyst. In certain embodiments, any of the above methods comprise a ratio of 500:1 to 5,000:1 of epoxide to catalyst. In certain embodiments, any of the above methods comprise a ratio of 500:1 to 1,000:1 of epoxide to catalyst.

In certain embodiments, any of the above methods comprise epoxide present in amounts between 0.5 M to 20 M and all values to the 0.1 M all and values therebetween. In certain embodiments, epoxide is present in amounts between 0.5 M to 2 M. In certain embodiments, epoxide is present in amounts between 2 M to 5 M. In certain embodiments, epoxide is present in amounts between 5 M to 20 M. In certain embodiments, epoxide is present in an amount of 20M. In certain embodiments, liquid epoxide comprises the reaction solvent. In certain embodiments, one or more additional epoxides are present at any of the aforementioned concentrations.

The catalyst is a bimetallic complex. For example, bismetallosalenate complexes, such as cobalt salenate complexes, can be used.

For example, the catalyst has the following structure:

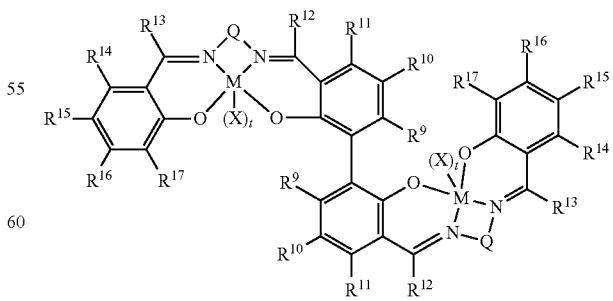

where M is a metal, X is a nucleophile or counterion, and t is an integer from 0 to 2. For example, X can be halide (—F, —Cl, —Br, —I), $C_1$ to $C_{20}$ carboxylate group, $C_1$ to $C_{20}$ alkoxide group, nitro group, azide group, or amido group. The catalyst can be racemic or chiral. Q is $C_1$ to $C_{20}$ aliphatic group, including all integer numbers of carbons and ranges therebetween, or $C_5$ to $C_{20}$ cycloalkyl group, including all integer numbers of carbons and ranges therebetween.

In an example, Q is

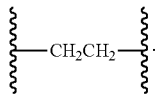

In another example, Q is

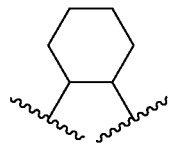 [SMILES: *C1CCCCC1*]

and the cyclohexane can be chiral or achiral. Each $R^9$ through $R^{17}$ independently are selected from the group consisting of hydrogen, $C_1$ to $C_{20}$ aliphatic group, including all integer numbers of carbons and ranges therebetween, halide (—F, —Cl, —Br, or —I), $C_1$ to $C_{20}$ alkoxide group, including all integer numbers of carbons and ranges therebetween, and $C_6$ to $C_{20}$ aryl group, including all integer numbers of carbons and ranges therebetween.

Certain groups on the catalyst ligand, taken together, can form ring structures. For example, two adjacent groups can form a ring structure. Accordingly, adjacent $R^9$, $R^{10}$, $R^{11}$, $R^{12}$, $R^{13}$, $R^{14}$, $R^{15}$, $R^{16}$, or $R^{17}$ groups can be taken together with their intervening atoms to form a saturated, partially unsaturated, or aromatic 5 to 12 membered ring (containing 0 to 4 heteroatoms), 5 to 6 membered carbocyclic group, aryl group, or 5 to 7-membered heteroaryl group. These rings or groups can, optionally, be substituted.

M is a metal of the periodic table. In certain embodiments M is a main group metal. In certain embodiments, M is a transition metal selected from the periodic table groups 3-12, inclusive, boron, or aluminum. In certain embodiments, M is a transition metal selected from the periodic table groups 3-12, inclusive. In certain embodiments, M is selected from the lanthanides. In certain embodiments, M is a transition metal selected from the periodic table groups 5-10, inclusive. In certain embodiments, M is a transition metal selected from the periodic table groups 7-9, inclusive. In some embodiments, M is selected from the group consisting of Cr, Mn, V, Fe, Co, Mo, W, Ru, Ti, Al, Zr, Hf, and Ni. In an embodiment, M is Co.

The catalyst can be made by methods known in the art. For example, the catalyst can be one of those described in US patent application No. 2010/0144969 A1, the disclosure of which with respect to catalysts and methods of making catalysts is incorporated herein by reference, and can be prepared by methods described therein.

In various examples, the catalyst used in the method has one of the following structures:

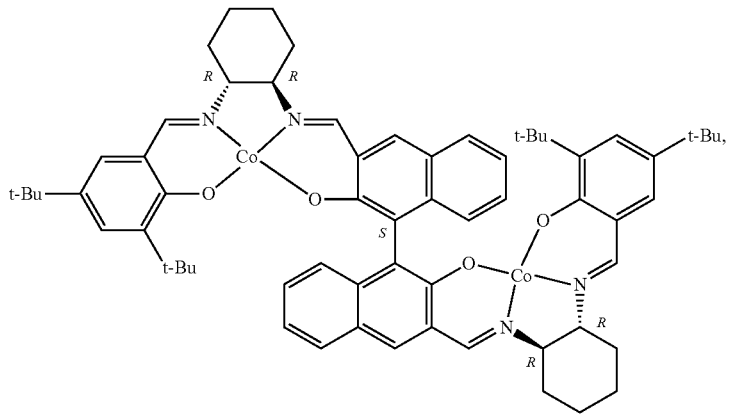

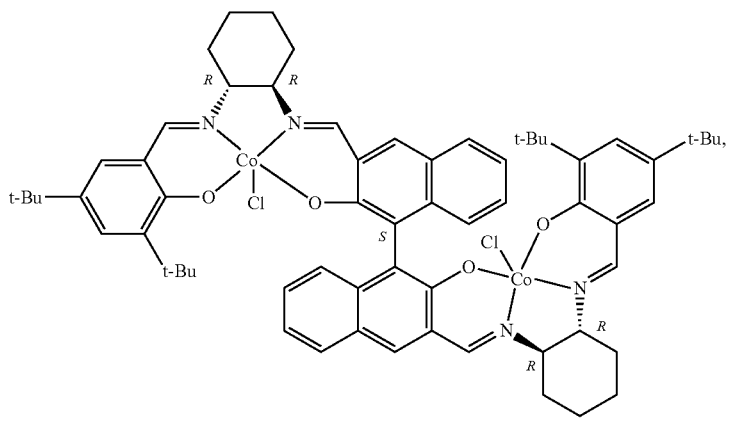

-continued
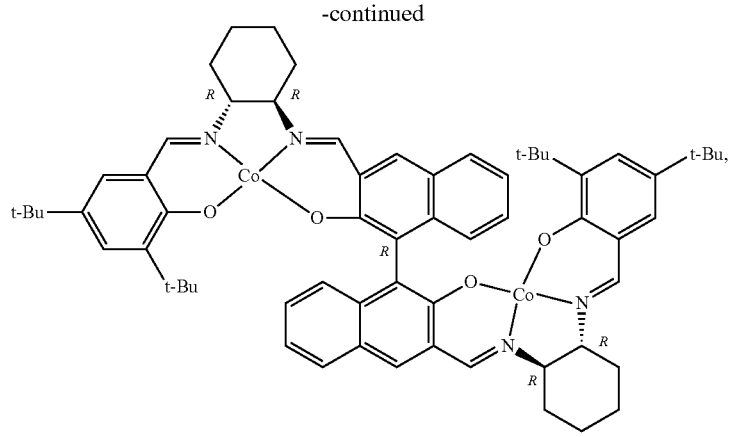
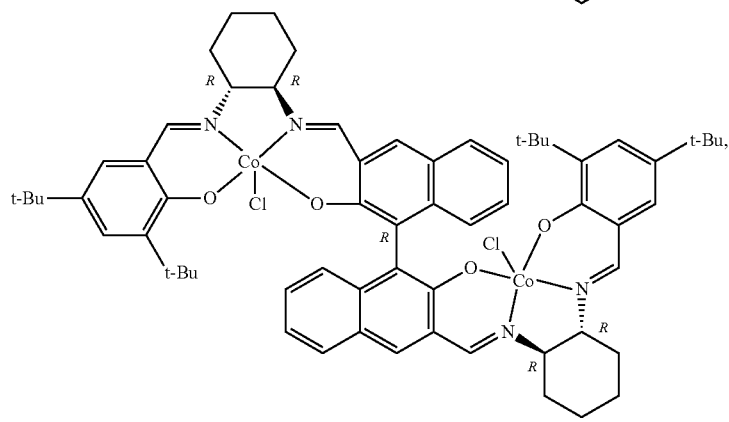
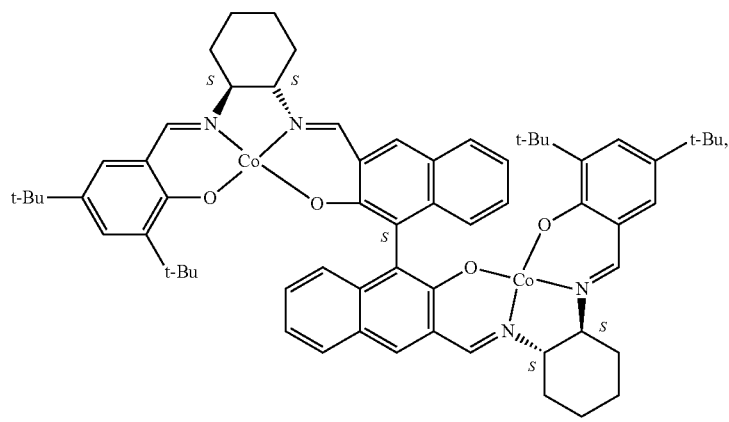
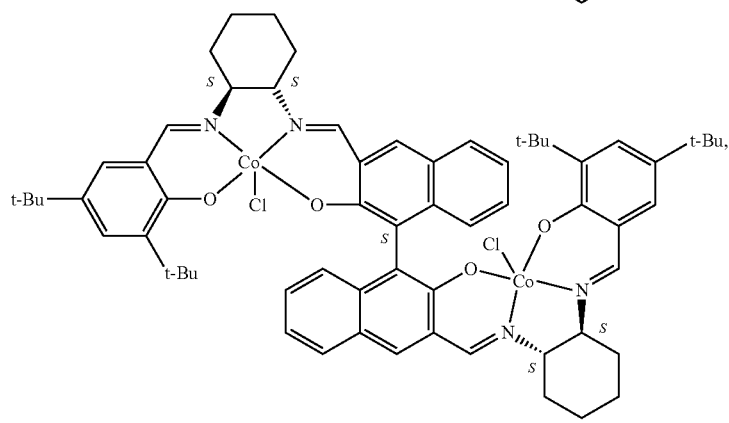

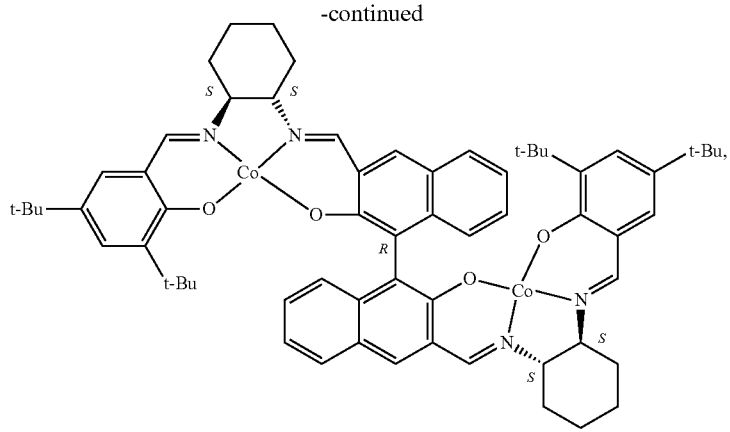

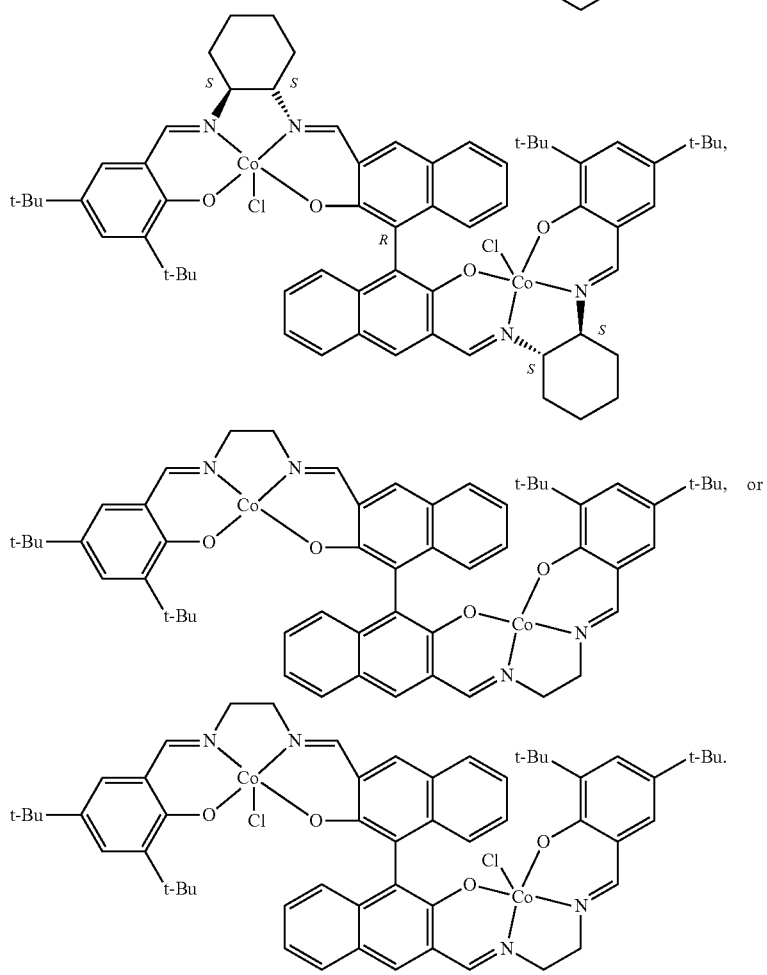

While not wishing to be bound by any particular theory, it is believed that the axial symmetry of provided bimetallic complexes is useful for providing enantioselective kinetic resolution of epoxides. In certain embodiments, additional chiral groups may be utilized in provided bimetallic complexes to modulate the enantioselectivity of the kinetic resolution process.

In an embodiment, the polymerization is carried out with a 50:50 mixture of enantiomers of catalyst to form an optically inactive polyether. In other embodiments, the polymerization is carried out with an enantiomerically enriched catalyst to form optically active polyethers. In still another embodiment, the polymerization is isoselective. In an embodiment, the catalyst is enantiomerically pure. In an embodiment, the polyether is optically pure.

In certain embodiments, when the bond between the biaryl linkage of provided catalyst is of S chirality, the provided products of the polymerization comprise polyethers with predominantly S chirality and epoxides with predominantly R chirality. In certain embodiments, when the bond between the biaryl linkage of provided bimetallic complexes is of R chirality, the provided products of the polymerization comprise polyethers with predominantly R chirality and epoxides with predominantly S chirality.

The catalyst can be present in a range of concentrations. For example, the methods comprise a catalyst present in an amount from 0.001 mole % to 1.0 mole % and all values to the 0.001 mole % and ranges therebetween. In various examples, the catalyst is present in an amount from 0.005 mole % to 0.5 mole %, or 0.01 mole % to 0.1 mole %. For example, the ratio of catalyst to ionic co-catalyst is 1:1, 1:5, 1:10, or 1:25 including all ratios therebetween.

While not wishing to be bound by any particular theory, it is believed that the axial symmetry of provided bimetallic complexes is useful for providing enantioselective polymerization. In certain embodiments, additional chiral groups may be utilized in provided bimetallic complexes to modulate the enantioselectivity of the polymerization process.

The ionic co-catalyst is a salt. For example, the co-catalyst is an ammonium salt, a phosphonium salt, or an arsonium salt. In certain embodiments, the co-catalyst is an ammonium salt. Examples of ammonium salts include, but are not limited to: (n-Bu)$_4$NCl, (n-Bu)$_4$NBr, (n-Bu)$_4$NN$_3$, [PPN]Cl, [PPN]Br, and [PPN]N$_3$, [Ph$_3$PCPh$_3$]Cl, [PPN]O(C=O)R$^x$ where R$^x$ is a C$_1$ to C$_{20}$ aliphatic or aryl group. (PPN=Bis(triphenylphosphoranylidene)ammonium)). In certain embodiments, a co-catalyst is the ammonium salt bis(triphenylphosphoranylidene)ammonium chloride ([PPN]Cl). In certain embodiments, a co-catalyst is PPNOAc. In certain embodiments, the co-catalyst is a tributylammonium salt. In certain embodiments, the co-catalyst is PPNOPiv (i.e.,

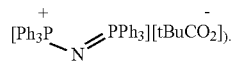

The multifunctional CTA forms a multifunctional CTG in the polyether polymer. The monoalcohol CTA forms a monoalcohol CTG in the polyether polymer. The multifunctional CTA has a plurality of functional groups that can facilitate formation of a polyether chain. For example, the multifunctional chain transfer agent has the following structure:

$$R^{18}-(COOH/OH)_z$$

where R$^{18}$ is C$_1$ to C$_{20}$ branched or linear aliphatic group, or a C$_1$ to C$_{20}$ or carbocyclic group, and z is from 1 to 10, including all integer values and ranges therebetween. The groups are optionally substituted. The monoalcohol CTA contains a single alcohol group. The multifunctional chain transfer agent can contain a plurality of carboxylic acid groups, a plurality of alcohol groups, or a combination of one or more carboxylic acid groups and one or more alcohol groups. For example, the chain transfer agent (CTA) is be a bifunctional CTA. For example, the CTA is a diol, a diacid, or a hydroxy acid. For example, the chain transfer agent is a diol with C$_1$ to C$_{20}$ optionally substituted branched or linear aliphatic group, or a C$_3$ to C$_{20}$ optionally substituted carbocyclic group. In an example, the diol has the following structure:

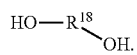

In an example, the hydroxyacid has the following structure:

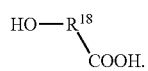

In another example, the diacid has the following structure:

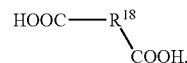

In yet another example, the diol has the following structure:

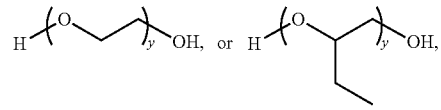

where y can be from 1 to 100. In various examples, the diol has one the following structures:

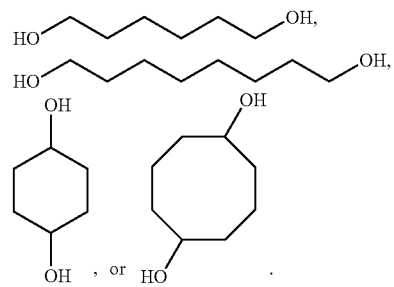

In various examples the multifunctional CTAs include sugars, polysaccharides, glycerols, and hydroxyl or carboxyl functional polymers (polyacrylates or polyvinylalcohols).

In various examples, the monoalcohol CTA is methanol, ethanol, i-propanol, benzyl alcohol, p-methoxybenzyl alcohol. In another example, the monoalcohol CTA has the following structure:

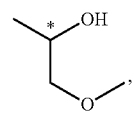

* denotes a chiral carbon center.

In an example, the epoxide are present in large excess of all of the other components in the reaction mixture. In certain embodiments, any of the above methods comprise a ratio of 10:1 to 10,000:1 and all ranges of values of ratios therebetween of epoxide to CTA. In certain embodiments, any of the above methods comprise a ratio of 10:1 to 50:1 of epoxide to CTA. In an embodiment, any of the above methods comprise a ratio of 10:1 to 50:1 of epoxide to CTA.

The epoxide, catalyst, ionic co-catalyst, and CTA can be contacted in a solvent. In an embodiment, the reaction step of the methods further comprises one or more solvents. The solvent can be an organic solvent. For example, the solvent is a hydrocarbon solvent such as an aromatic hydrocarbon solvent (e.g., toluene) or an aliphatic hydrocarbon. In another example, the solvent is a halogenated hydrocarbon. In another example, the solvent is an ether, such as tetrahydrofuran. In an embodiment, the reaction step of any of the methods does not comprise a solvent.

Various quenching agents can be used. For example, quenching agents that are a source of protons are used. In another example, quenching agents (alkyl/silyl halides) can also be used to further functionalize the polymers.

Reaction times and conditions (e.g., reaction temperature) for the method can be varied to achieve the desired result.

Selection of certain reaction times and conditions is within the purview of one having skill in the art. Generally, reaction times under 24 hours are used. For example, the method is conducted at a temperature of from −78° C. to 100° C. In various examples, the reaction is conducted at a temperature of from −10° C. to 30° C., 20° C. to 100° C., 20° C. to 80° C., or 20° C. to 50° C. The reaction can be conducted in a static atmosphere (e.g., a sealed reaction vessel) or as a stream (e.g., a flow-type reactor) under inert atmosphere. The reaction can be carried out at ambient conditions (e.g., 20° C.).

In an embodiment, the method uses 1,6-hexanediol as a chain transfer agent with catalyst 1 and co-catalyst 2 from Example 2 to polymerize propylene oxide to give desired isotactic telechelic diols. These methods provide a route to isotactic telechelic diol with both diols being primary, which allows for easier polyurethane formation.

The steps of the method described in the various embodiments and examples disclosed herein are sufficient to produce polyethers of the present invention. Thus, in an embodiment, the method consists essentially of a combination of the steps of the methods disclosed herein. In another embodiment, the method consists of such steps.

The polyethers of the present invention can be used in materials such as polyurethanes, elastomers, thermosets, and thermoplastics. The polymers can be used as non-ionic surfactants. The polymers can be used in biomedical devices.

The following examples are presented to illustrate the present invention. They are not intended to limiting in any manner.

EXAMPLE 1

This example provides syntheses of polyethers using both monoalcohol CTAs and multifunctional CTAs.

Explored were the use of alcohols as CTAs with 1/2 to synthesize isotactic PPO with controlled MW and end-groups from racemic PO. Also described are new routes to highly isotactic telechelic PPO diols for potential use in polyurethanes.

Experimental Section. General Considerations. All manipulations of air or water sensitive compounds were carried out under dry nitrogen using a Braun Labmaster drybox or standard Schlenk line techniques. NMR spectra were recorded on Varian INOVA 400 ($^1$H, 400 MHz), or Varian NOVA 600 ($^1$H, 600 MHz) spectrometers. $^1$H NMR spectra were referenced with residual solvent shifts ($CHCl_3$=7.26 ppm). $^{13}$C NMR spectra were referenced by solvent shifts ($CDCl_3$=77.16 ppm).

Representative Polymerization: Synthesis of iPrO-PPO. In a drybox under nitrogen atmosphere, 1 (4.0 mg, 3.5 μmol), and 2 (4.5 mg, 7.0 μmol) were added to a reactor vial containing a stir bar and 6 mL toluene. The vial was sealed and removed from the glove box. Using Schlenck line techniques 140 μL of 1 M isopropanol in toluene was added. PO (0.846 g, 14.3 mmol) was then added via syringe with rapid stirring. After 4 minutes all volatiles were quickly removed under vacuum. The product was dried overnight. Conversion was determined gravimetrically (0.417 g, 49.2%). A concentrated sample of polymer (50 mg in 0.7 mL of $CDCl_3$) was analyzed using $^{13}$C NMR spectroscopy to determine polymer tacticity. $^1$H NMR ($CDCl_3$, 600 MHz): δ 3.91 (m, 1H), 3.56-3.49 (m, 106H), 3.39 (m, 53H), 1.11 (d, J=5.5 Hz, 159H). $^{13}$C {$^1$H} NMR ($CDCl_3$, 150 MHz): δ 75.64, 73.61, 65.60, 22.25, 22.10, 17.64. $M_n^{GPC}$=6.0 kg/mol, $M_w/M_n$=1.8.

Results and Discussion. Initial Polymerization Studies with 1/2 and Alcohols as Chain Transfer Agents. The catalyst system 1/2 to polymerize PO in the presence of 5-40 eq. of $^i$PrOH CTA was investigated (Table 1). Regardless of $^i$PrOH loading, the system displays high activity and enantioselectivity, producing PPO with high melting points ($T_m$), mm values, and s-factors ($k_S/k_R$). Analysis of polymer tacticity by $^{13}$C NMR spectroscopy showed a ratio of stereoerrors of mr=rm=rr, consistent with an enantiomorphic site control mechanism. The $M_n$ values determined by $CHCl_3$ gel-permeation chromatography (GPC) calibrated with polystyrene, as well as by $^1$H NMR spectroscopy decreased with additional $^i$PrOH. At higher alcohol loadings the $M_n$ calculated from $^1$H NMR matched well with the theoretical $M_n$ calculated from 1 chain per $^i$PrOH. Terminal diastereotopic isopropyl methyl resonances were observed by $^{13}$C NMR spectroscopy. Isopropyl end-groups were also observed by MALDI-MS (entry 5), demonstrating that $^i$PrOH acts as a CTA, controlling MW and end-group identity, prompting us to further explore the behavior of 1/2 with alcohols.

TABLE 1

Polymerization of rac-PO Using $^i$PrOH as CTA and Catalyst System 1/2$^a$

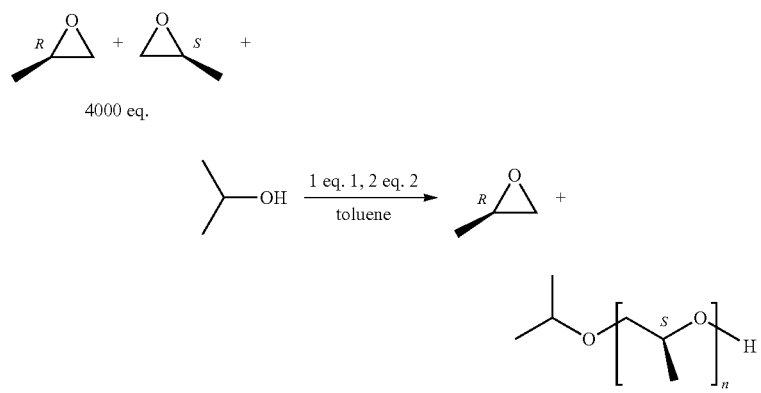

| entry | CTA eq. | time (min) | conv. (%) | $M_n^{Theo}$ (kg/mol) | $M_n^{NMR}$ (kg/mol)$^b$ | $M_n^{GPC}$ (kg/mol)$^c$ | $M_w/M_n^c$ | [mm] (%)$^d$ | s-factor$^d$ | $T_m$ (° C.)$^e$ |
|---|---|---|---|---|---|---|---|---|---|---|
| 1 | 0 | 1 | 47.7 | 113 | — | 219 | 3.1 | 97.9 | >300 | 65.8 |
| 2 | 5 | 1.5 | 49.8 | 21.7 | 28.4 | 37.2 | 1.6 | 97.8 | >300 | 69.6 |
| 3 | 10 | 3 | 45.5 | 10.9 | 8.9 | 18.7 | 1.5 | 98.7 | >300 | 67.9 |

TABLE 1-continued

| 4 | 20 | 4 | 49.9 | 5.9 | 4.7 | 11.1 | 1.8 | 96.6 | >300 | 69.0 |
| 5 | 40 | 4 | 49.2 | 3.0 | 3.1 | 6.0 | 1.8 | 99.1 | >300 | 68.0 |

[a]General conditions: [1]:[2]:[PO] = 1:2:4000, $T_{rxn}$ = 0° C., [PO] = 2M in toluene.
[b]Determined by $^1$H NMR spectroscopy.
[c]Determined by gel-permeation chromatography calibrated with polystyrene standards in CHCl$_3$ at 40° C.
[d]Isotactic mm triad content determined by $^{13}$C NMR spectroscopy.
[e]Determined by differential scanning calorimetry.

Figure 3:
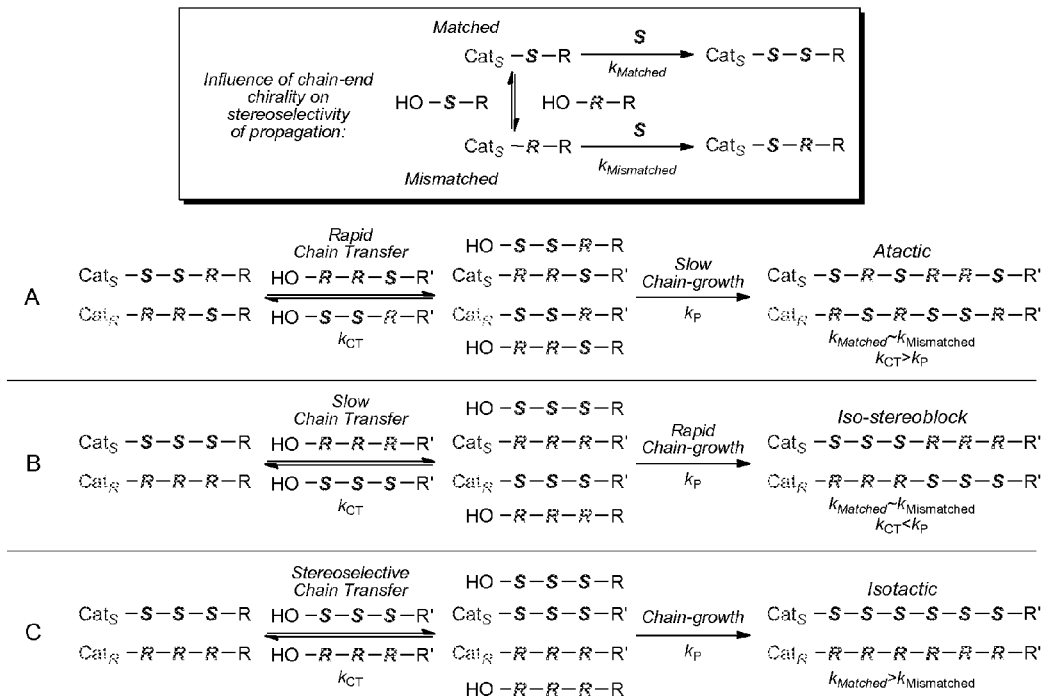
FIG. 3. Stereochemical possibilities during polymerization of rac-PO with rac-1/2 in the presence of CTAs.
Figure 4:
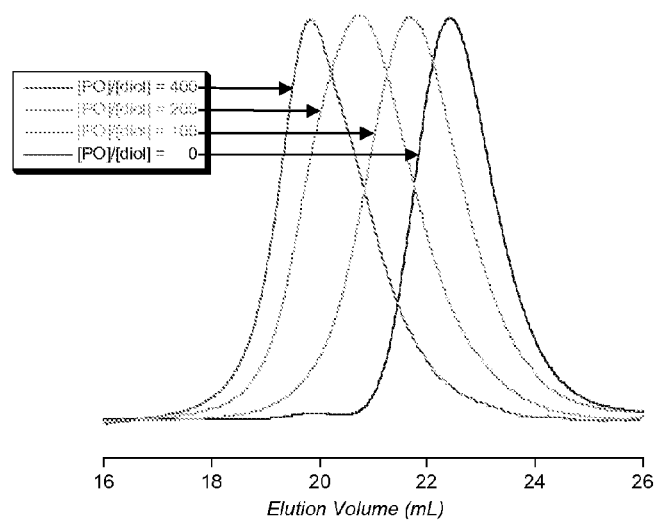
FIG. 4. Representative GPC chromatographs of poly(1-butene)diolate initiated PPO (Table 5).
Figure 5:
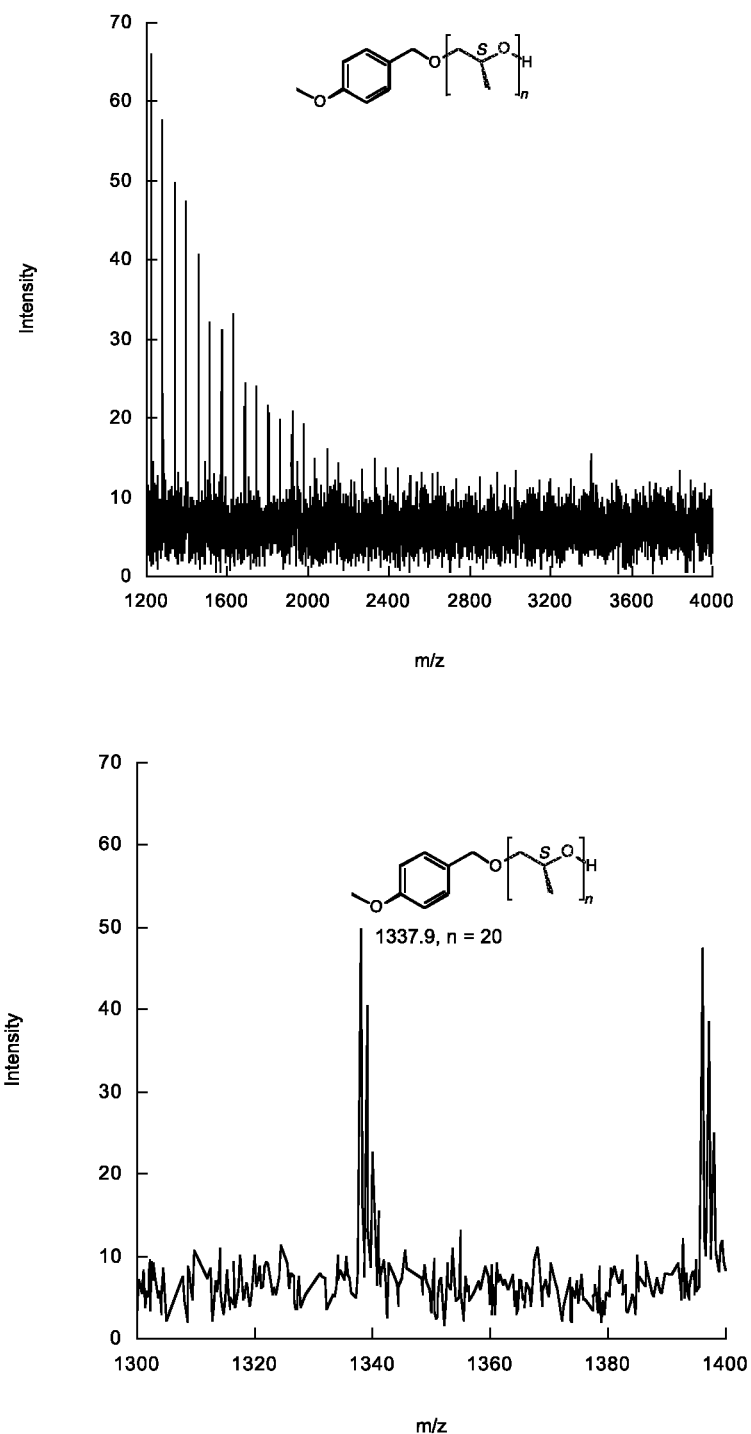
FIG. 5. Representative MALDI-MS of iPPO diol (Table 6, entry 5). Top: full. Bottom: expansion.
Figure 6:
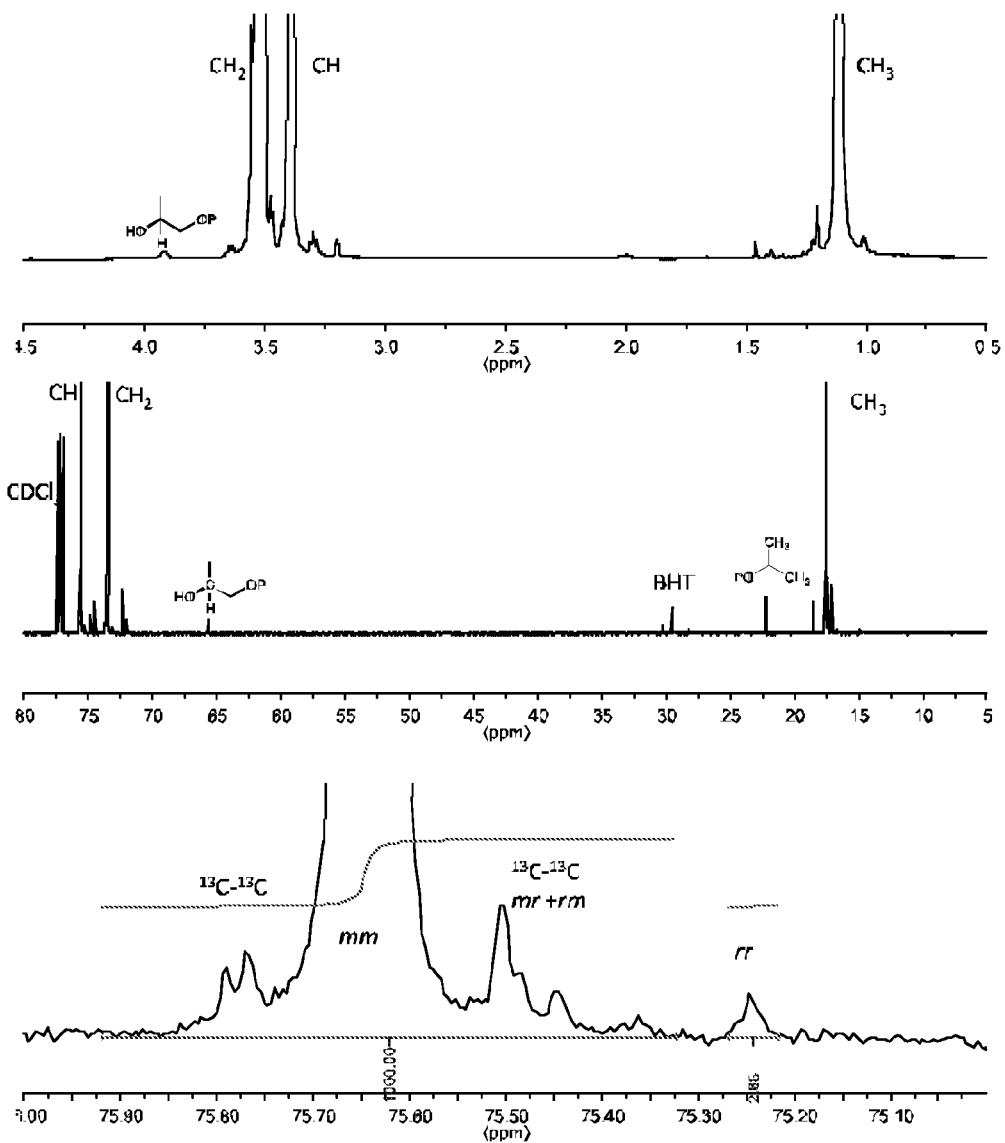
FIG. 6. Isopropoxide initiated PPO (Table 1, entry 5) Top: Example of $^1$H NMR spectrum in $CDCl_3$. Center: Example of $^{13}$C NMR spectrum in $CDCl_3$. Bottom: Expansion of methine region showing predominantly site-control errors.
Figure 7:
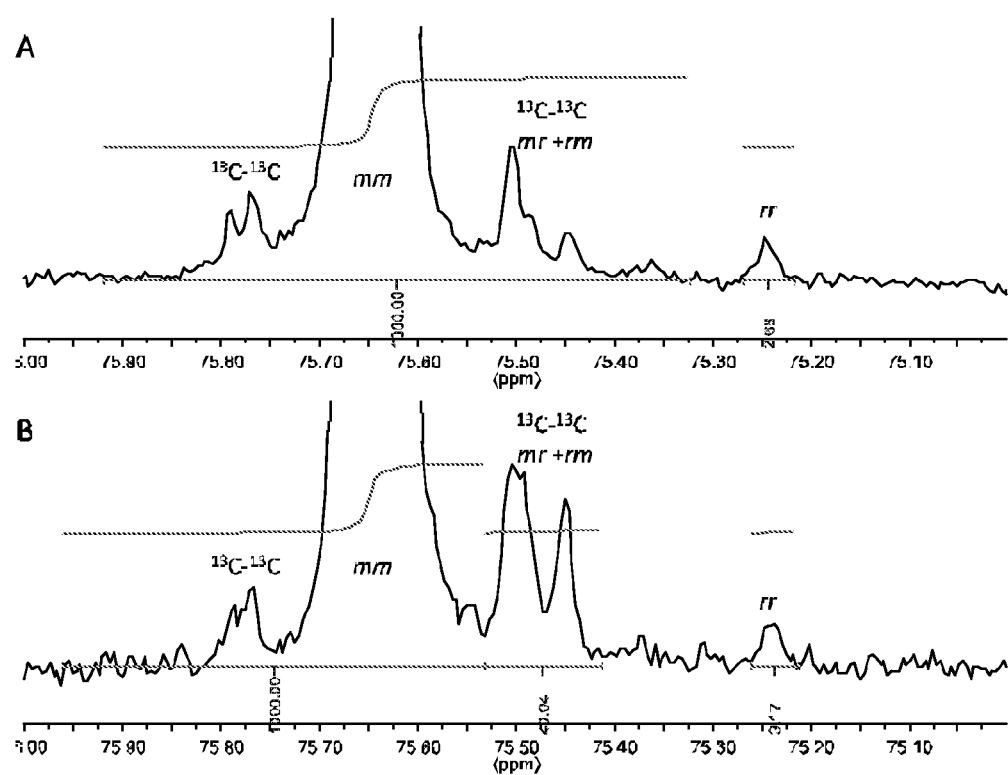
FIG. 7. Example of $^{13}$C NMR spectra of isopropoxide initiated PPO in $CDCl_3$. A) Expansion of methine region showing predominantly site-control errors (Table 1, entry 5). B) Expansion of methine region showing predominantly chain-end errors (Table 3, entry 4).
Figure 8:
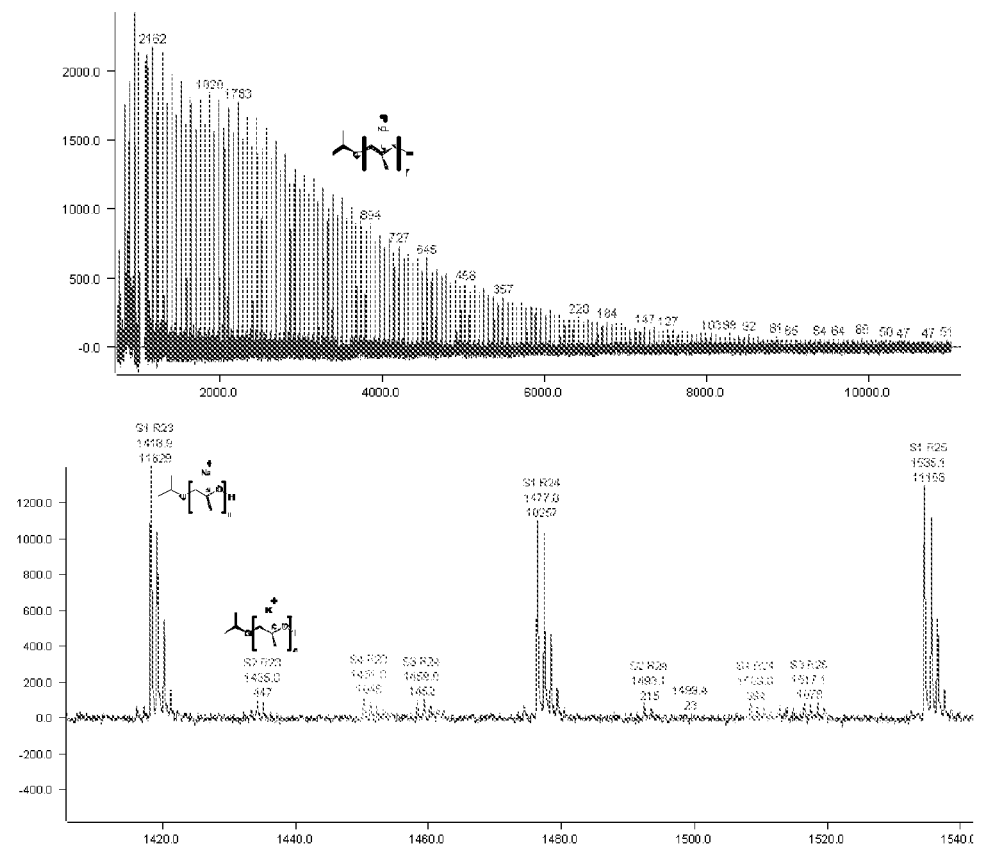
FIG. 8. Representative MALDI-MS of isopropoxide initiated PPO (Table 3, entry 4) $M_n$=2.4 PDI=1.4.
Figure 9:
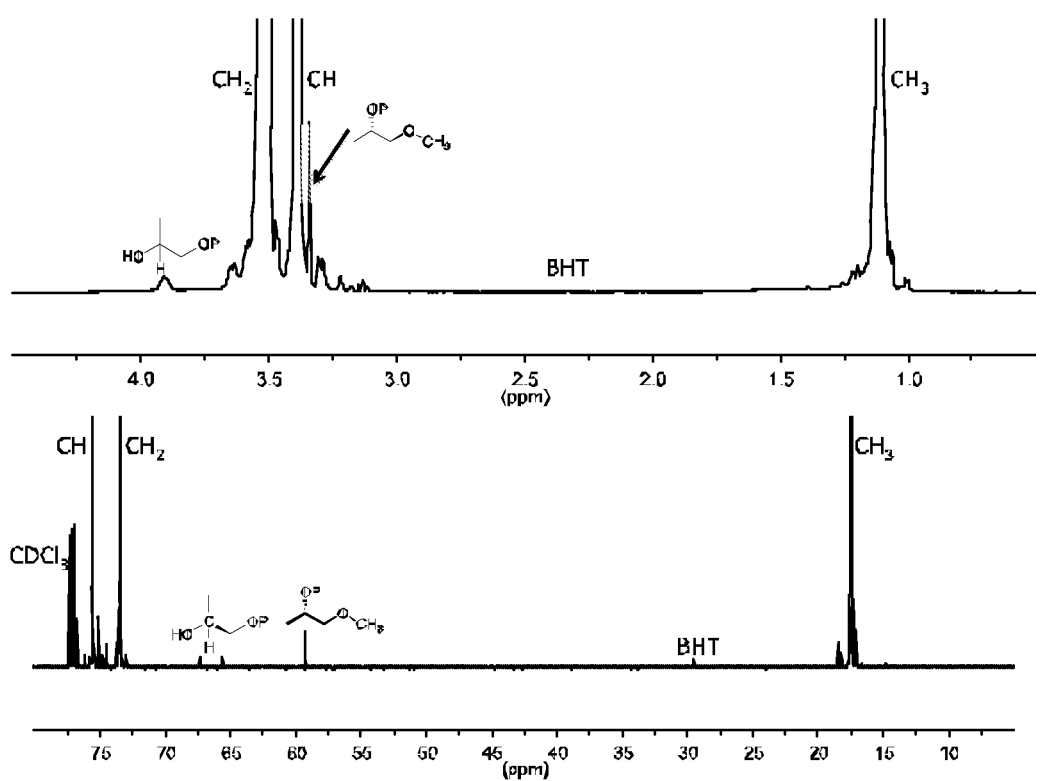
FIG. 9. Example of NMR spectra of (S)-1-methoxy-2-propoxide initiated PPO (Table 2, entry 1) in $CDCl_3$. Top: $^1$H NMR spectrum. Bottom: $^{13}$C NMR spectrum.
Figure 10:
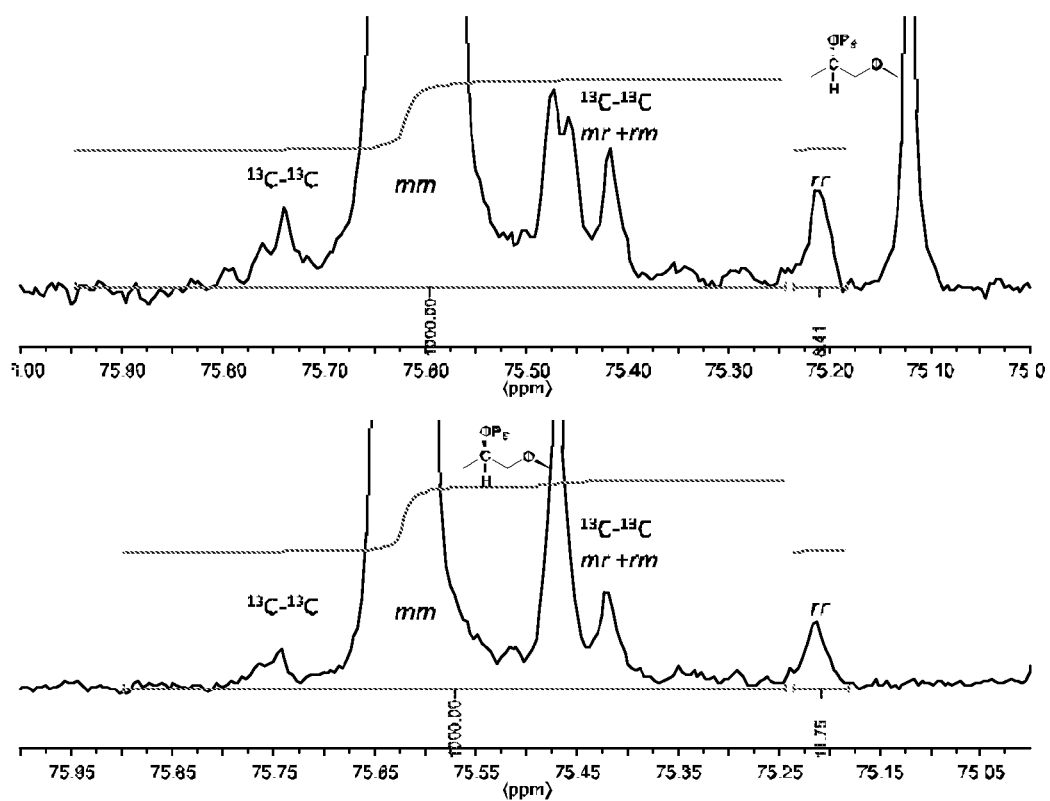
FIG. 10. Example of $^{13}$C NMR spectra of 1-methoxy-2-propoxide initiated PPO in $CDCl_3$ Top: Expansion of methine region (Table 2, entry 1). Bottom: Expansion of methine region (Table 2, entry 2).
Figure 11:
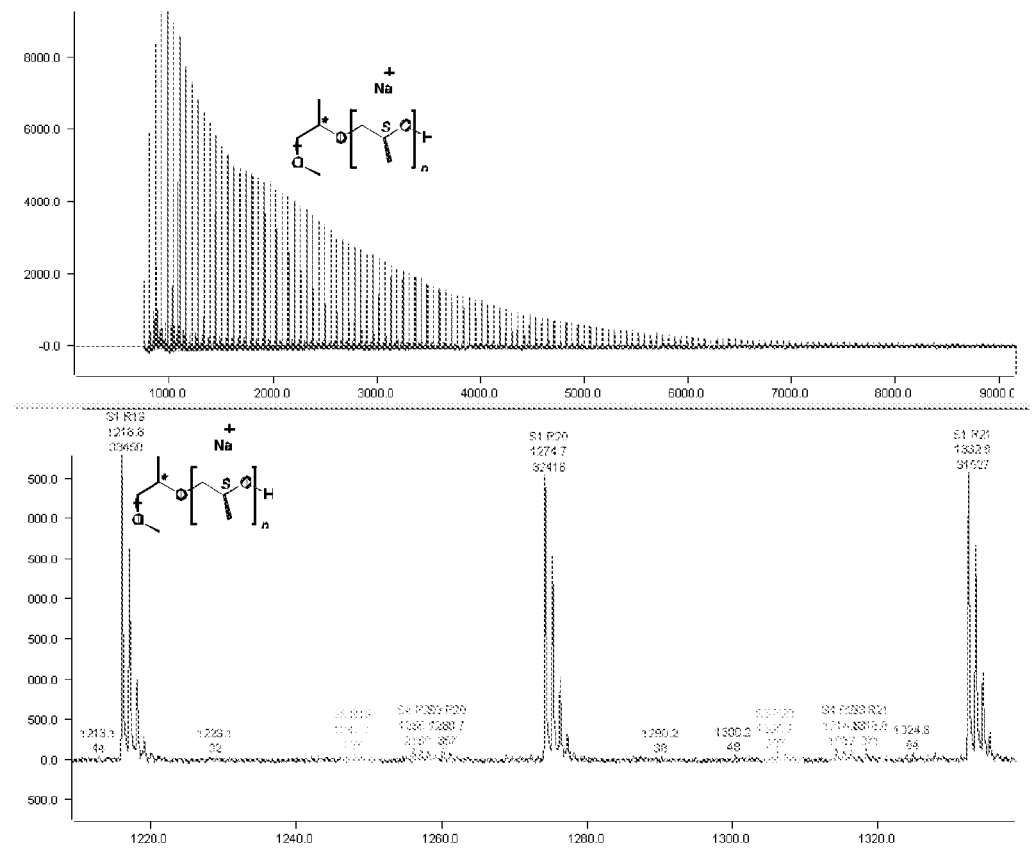
FIG. 11. Representative MALDI-MS of (S)-1-methoxy-2-propoxide initiated PPO (Table 2, entry 1) $M_n$=2.1 k PDI=1.3.
Figure 12:
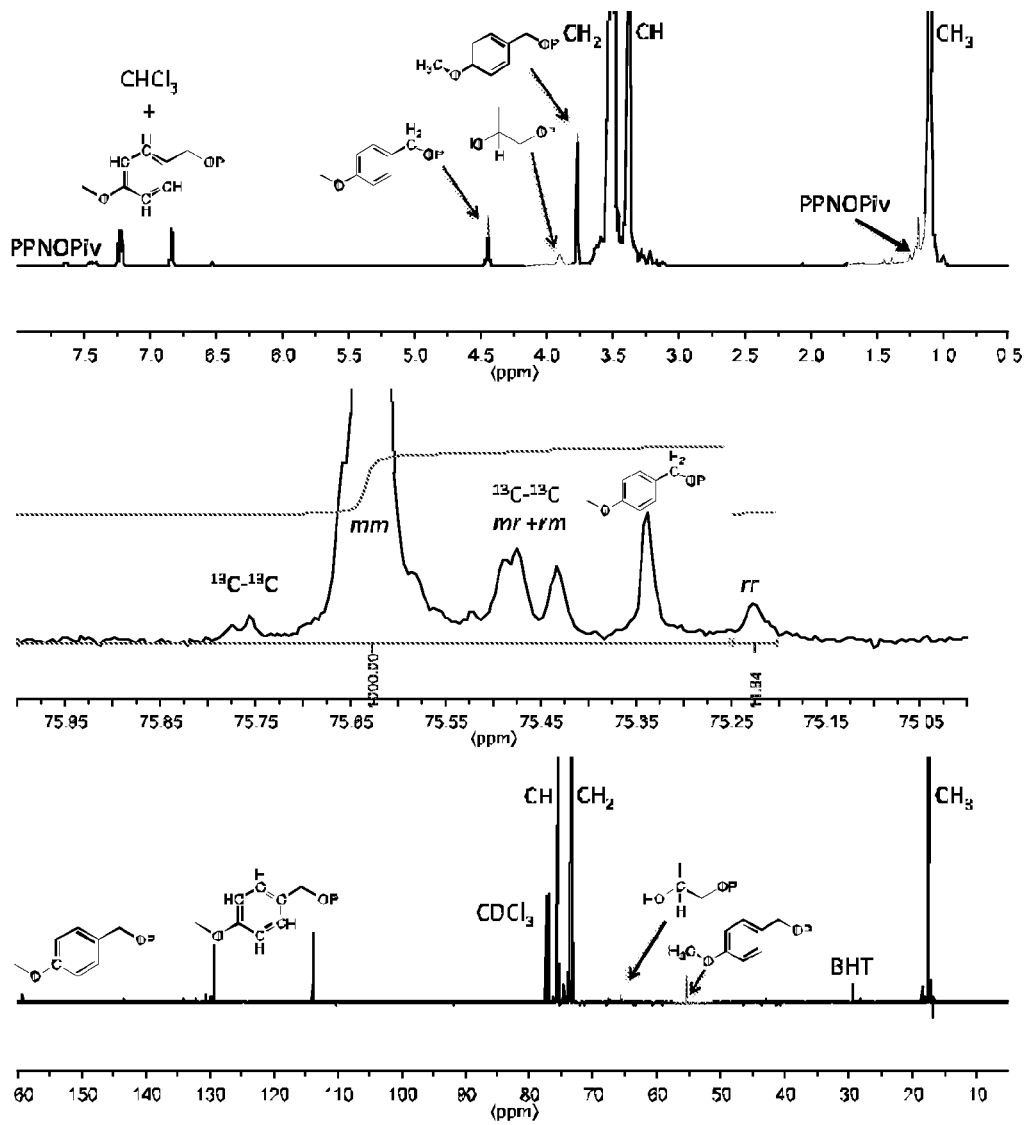
FIG. 12. Example of NMR spectra of PMB initiated PPO (Table 4, entry 4 before deprotection) in $CDCl_3$. Top: $^1$H NMR spectrum. Center: $^{13}$C NMR spectrum. Bottom: Expansion of methine region.
Figure 13:
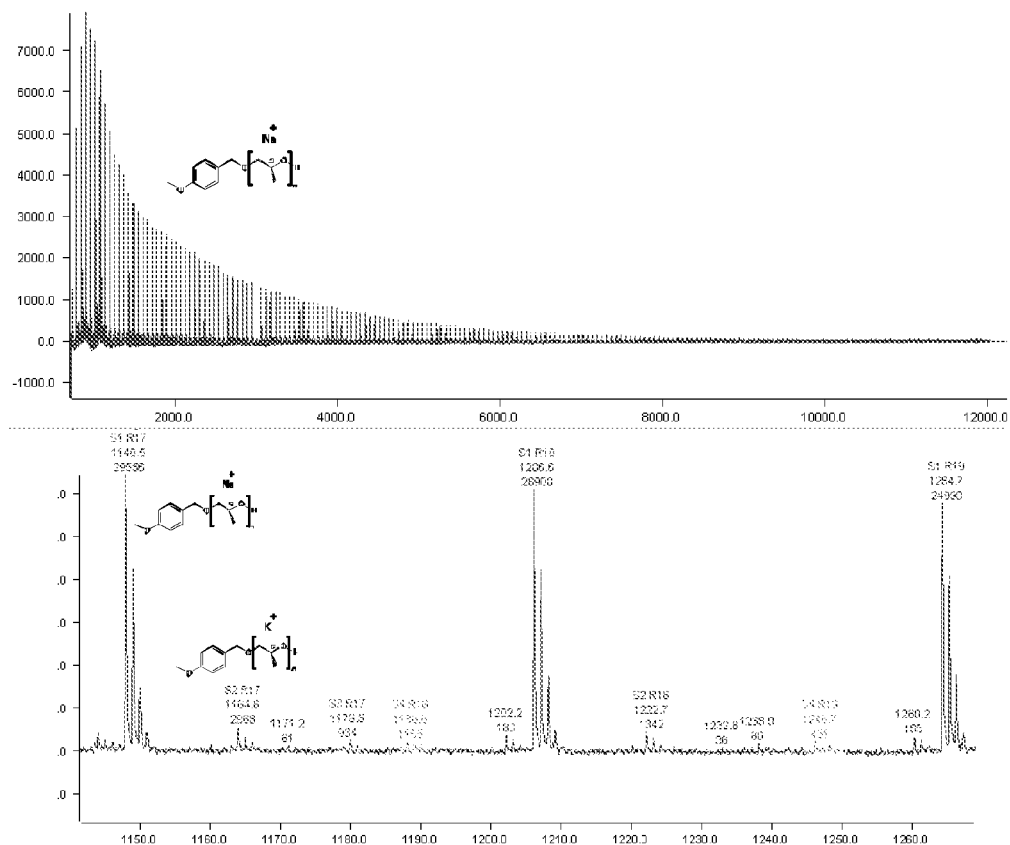
FIG. 13. Representative MALDI-MS of PMB initiated PPO (Table 4, entry 4) $M_n$=1.9 k PDI=1.4.
Figure 14:
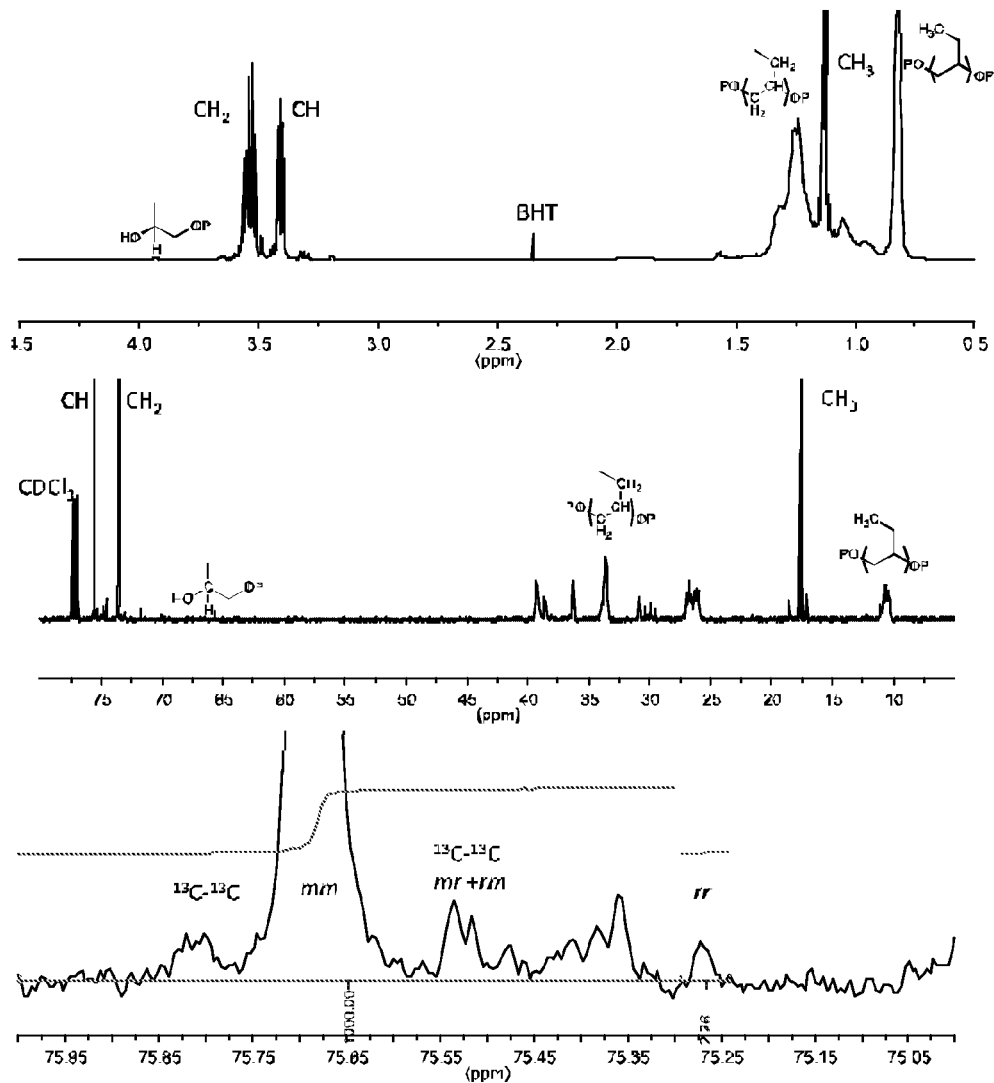
FIG. 14. Example of Poly(1-butene)diolate initiated PPO. (Table 5, entry 4) in $CDCl_3$. Top: $^1$H NMR spectrum. Center: $^{13}$C NMR spectrum. Bottom: Expansion of methine region.
Figure 15:
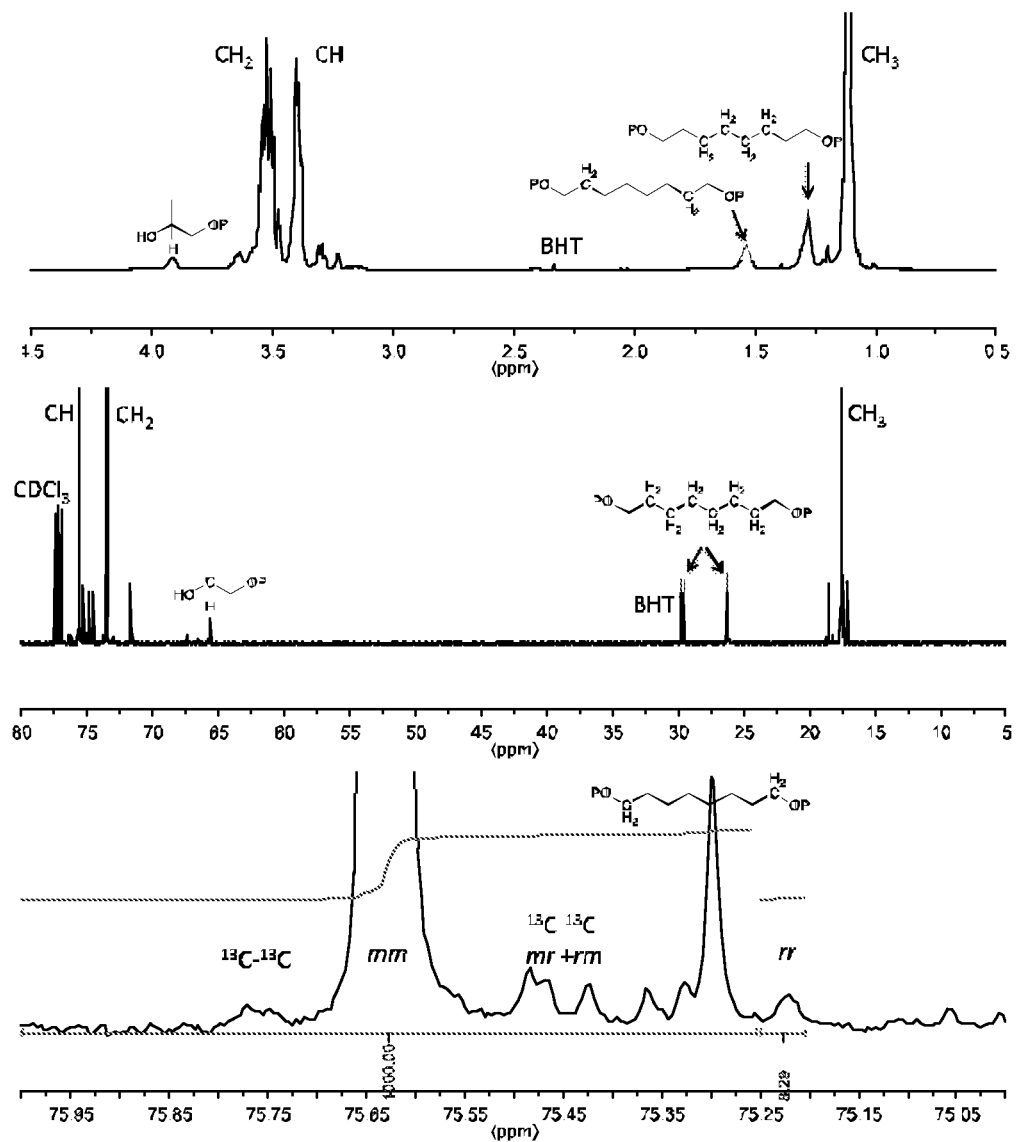
FIG. 15. Examples of NMR spectra of 1,8-octanediolate initiated PPO (Table 7, entry 5) in $CDCl_3$. Top: $^1$H NMR spectrum. Center: $^{13}$C NMR spectrum. Bottom: Expansion of methine region.
Figure 16:
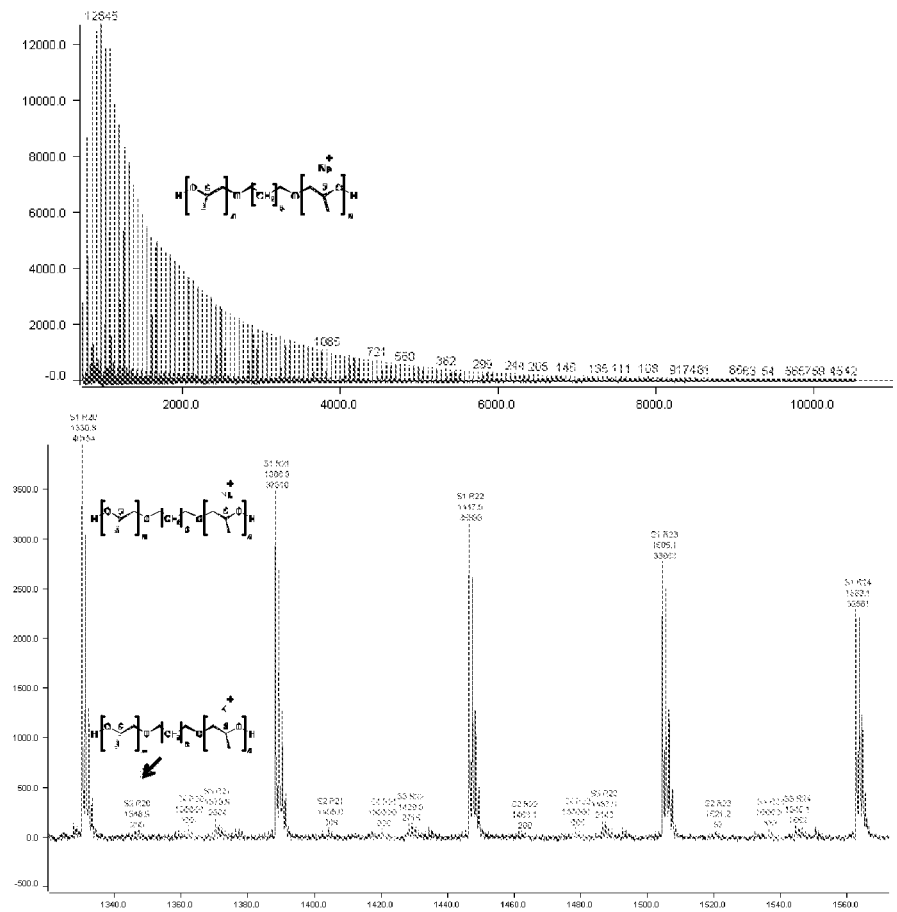
FIG. 16. Representative MALDI-MS of 1,8-octanediolate initiated PPO (Table 7, entry 5) $M_n$=1.9 k PDI=1.3.
Figure 17:
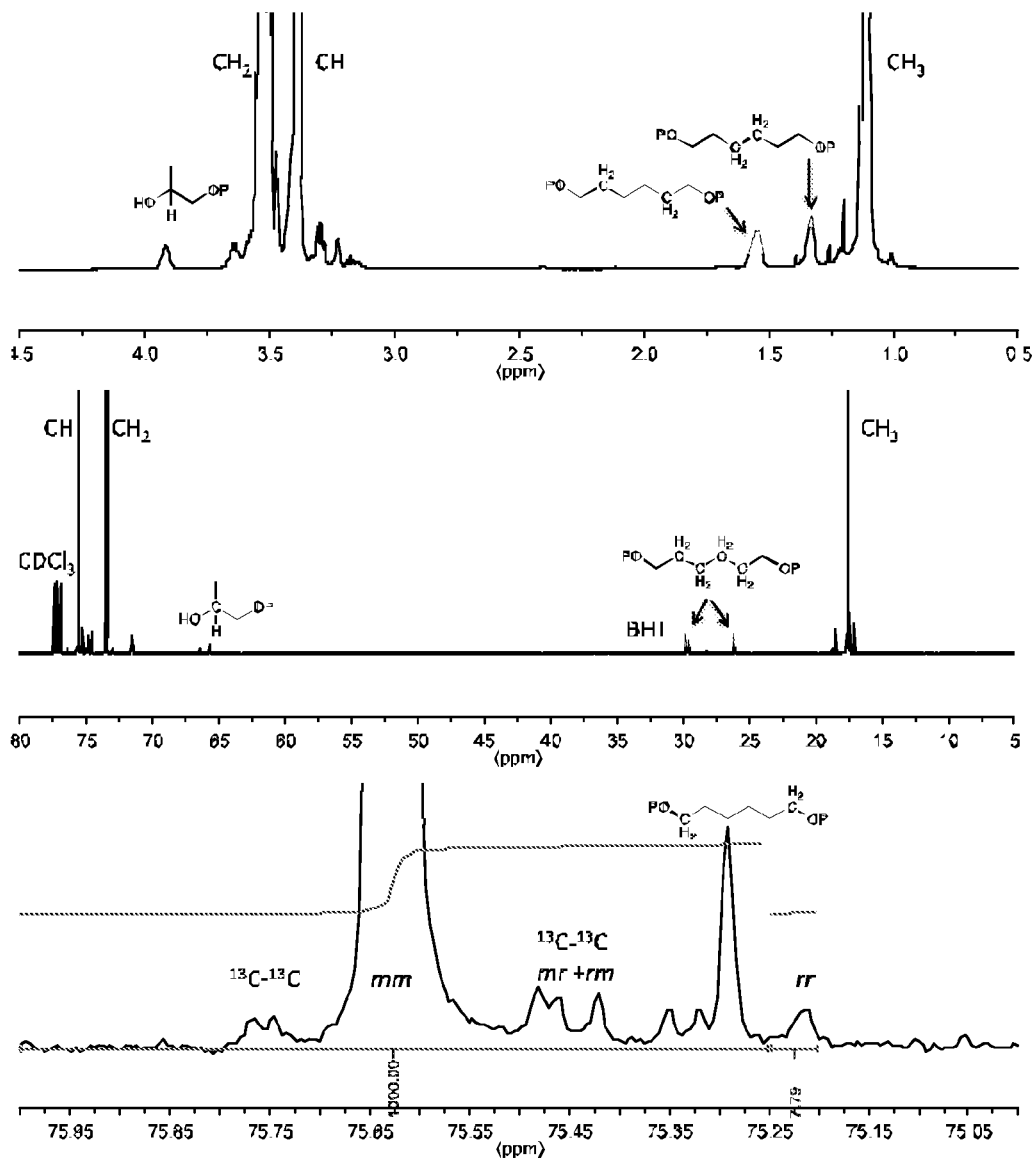
FIG. 17. Examples of NMR spectra of 1,6-hexanediolate initiated PPO (Table 6, entry 5) in $CDCl_3$. Top: $^1$H NMR spectrum. Center: $^{13}$C NMR spectrum. Bottom: Expansion of methine region.
Figure 18:
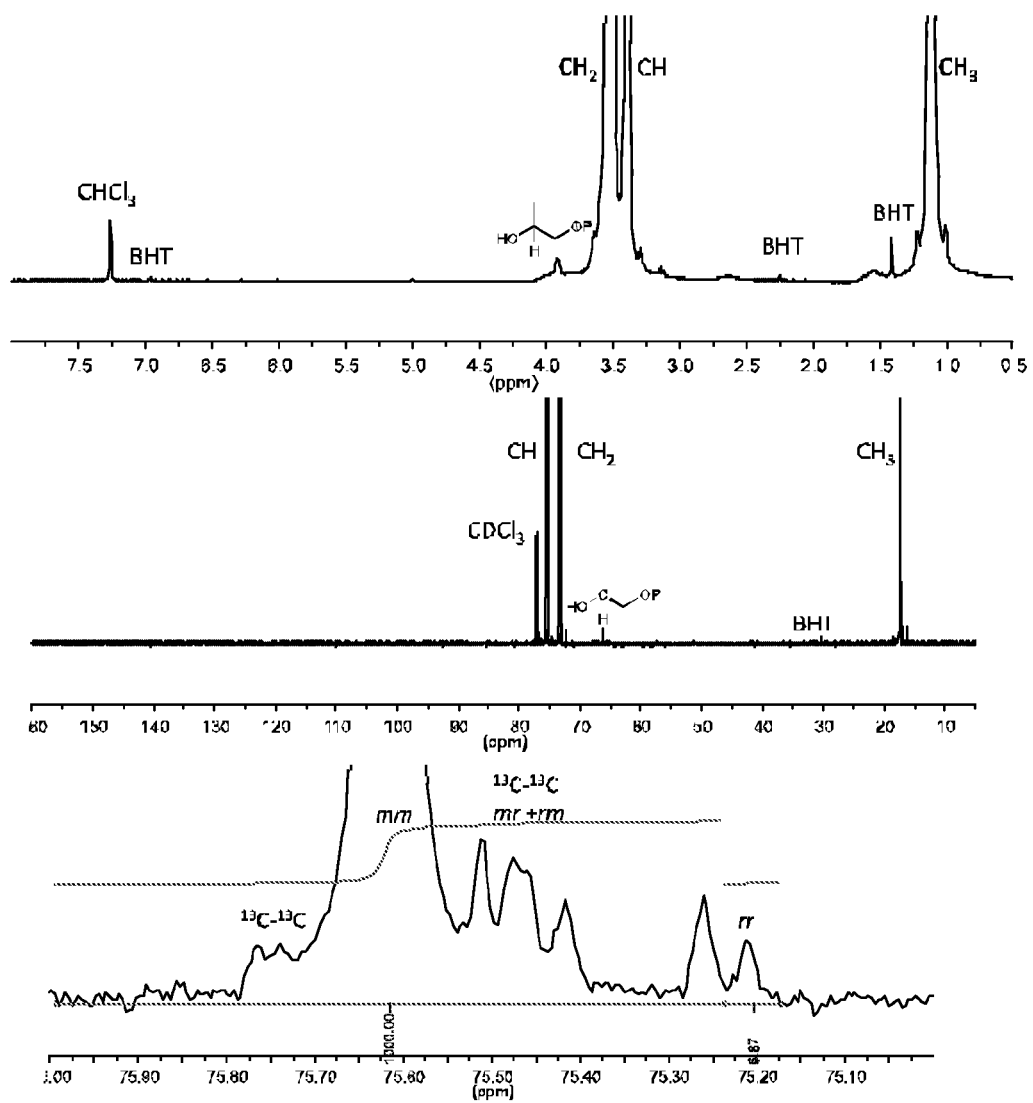
FIG. 18. Examples of NMR spectra of PPO diol (Table 4, entry 4 after deprotection) in CDCl$_3$. Top: $^1$H NMR spectrum. Center: $^{13}$C NMR spectrum. Bottom: Expansion of methine region.
Figure 19:
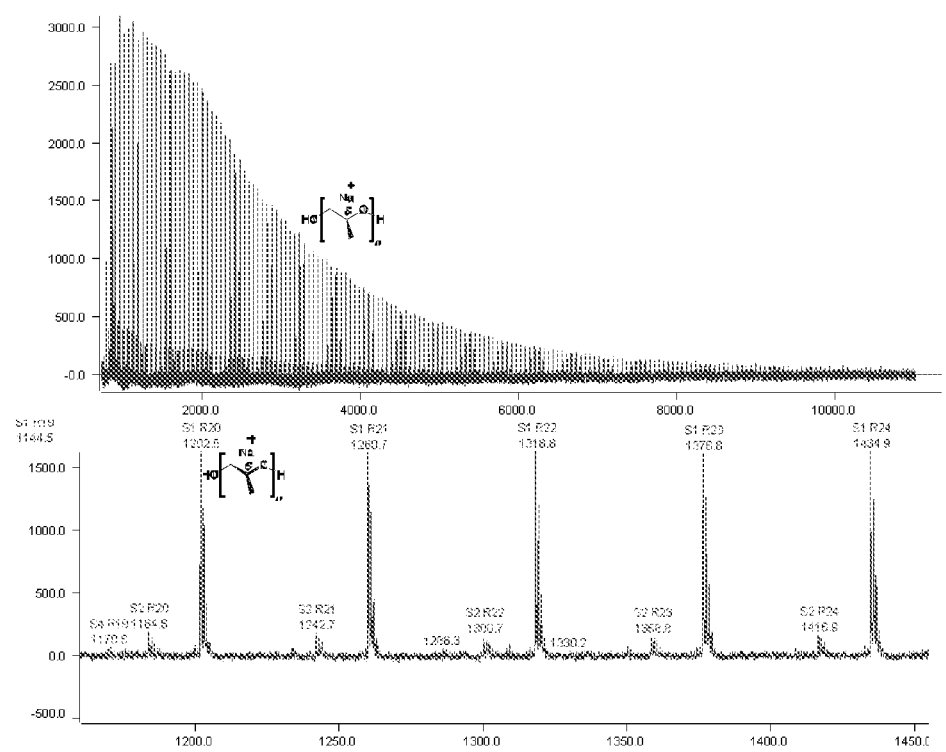
FIG. 19. Representative MALDI-MS of PPO diol (Table 4, entry 4 after deprotection) M$_n$=2.3 k PDI=1.3.

There are three stereochemical possibilities when racemic PO is polymerized with a racemic enantioselective catalyst (rac-1) in the presence of alcohol CTAs as shown in FIG. 3 A: Atactic polymers are formed if the rate of propagation ($k_P$) is slow relative to the rate of chain transfer ($k_{CT}$) and the catalyst displays no stereoselectivity in propagation from chiral alcohol-chain-ends ($k_{Matched} \sim k_{Mismatched}$, FIG. 3 A). B: Stereoblock isotactic are formed if propagation is fast relative to chain transfer and the catalyst displays no stereoselectivity in propagation from chiral alcohol-chain-ends ($k_{Matched} \sim k_{Mismatched}$, FIG. 3 B). C: Isotactic enantiopure polymer chains are formed regardless of chain transfer rates if the catalyst displays high stereoselectivity for propagating from only one enantiomer of chiral alcohol-chain-ends ($k_{Matched} > k_{Mismatched}$, FIG. 3 C).

Experiments were performed using chiral alcohols as models of propagating PPO chain-ends in order to determine the catalyst's rates of propagation from matched and mismatched alcohols (FIG. 3). Polymerizations using either enantiomer of enantiopure 1-methoxy-2-propanol as a CTA with enantiopure 1/2 gave similar low MW, crystalline, isotactic PPO (Table 2). The similar MWs in all entries demonstrate that the catalyst can propagate from both enantiomers of chiral alcohols ($k_{Matched} \sim k_{Mismatched}$, FIG. 3). The polymerization of PO with a racemic mixture of 1 and its enantiomer (rac-1) using $^i$PrOH as a CTA produced polymers with isopropoxide endgroups, high $T_m$, and mm values, as well as a decrease in MW as the amount of $^i$PrOH was increased (Table 3). Analysis of polymer tacticity by $^{13}$C NMR spectroscopy showed a ratio of stereoerrors of mr=rm>rr indicating that stereoerrors are propagated. This is in contrast to polymerizations of PO using rac-1 without $^i$PrOH (entry 1). Use of CTAs with rac-1 allows chain transfer of a polymer chain from an R—PO selective catalyst to its S—PO selective enantiomer (or vice-versa) followed by further propagation producing isotactic stereoblock PPO. GPC analysis displays a narrowing of MW distribution ($M_w/M_n \sim 1.6$) compared to polymerizations without added CTAs ($M_w/M_n > 2$), which is indicative of reversible chain transfer. These results are consistent with fast propagation and slow reversible chain transfer between dormant alcohol and propagating polymer alkoxide with low stereoselectivity for propagation from chiral alcohols as in FIG. 3 B.

TABLE 2

Polymerization of rac-PO Using 1-Methoxy-2-propanol CTA and Catalyst System 1/2[a]

| entry | stereochemistry 1 | CTA | conv. (%) | $M_n^{Theo}$ (kg/mol) | $M_n^{NMR}$ (kg/mol)[b] | $M_n^{GPC}$ (kg/mol)[c] | $M_w/M_n^c$ | [mm] (%)[d] | $T_m$ (° C.)[e] |
|---|---|---|---|---|---|---|---|---|---|
| 1 | (R,R)$_2$S | S | 51.8 | 3.1 | 1.5 | 3.3 | 1.2 | 97.5 | 62.6 |
| 2 | (S,S)$_2$R | S | 53.5 | 3.2 | 1.5 | 3.2 | 1.8 | 96.6 | 61.1 |
| 3 | (R,R)$_2$S | R | 50.8 | 3.0 | 1.7 | 3.7 | 1.6 | 98.1 | 61.5 |
| 4 | (S,S)$_2$R | R | 50.9 | 3.0 | 1.6 | 4.0 | 1.4 | 98.2 | 62.8 |

[a]General conditions: [1]:[2]:[1-methoxy-2-propanol]:[PO] = 1:2:40:4000, t = 1 h, $T_{rxn}$ = 20° C., [PO] = 2M in toluene.
[b]Determined by $^1$H NMR spectroscopy.
[c]Determined by gel-permeation chromatography calibrated with polystyrene standards in CHCl$_3$ at 40° C.
[d]Isotactic mm triad content determined by $^{13}$C NMR spectroscopy.
[e]Determined by differential scanning calorimetry.

TABLE 3

Polymerization of rac-PO Using $^i$PrOH and Catalyst System rac-1/2$^a$

| entry | CTA eq. | conv. (%) | $M_n^{Theo}$ (kg/mol) | $M_n^{NMR}$ (kg/mol)$^b$ | $M_n^{GPC}$ (kg/mol)$^c$ | $M_w/M_n^c$ | [mm] (%)$^d$ | $T_m$ (°C.)$^e$ |
|---|---|---|---|---|---|---|---|---|
| 1 | 0 | 76.4 | 92.5 | — | 204 | 2.3 | 98.6 | 65.8 |
| 2 | 10 | 67.8 | 8.0 | 6.6 | 23.0 | 1.5 | 97.9 | 67.9 |
| 3 | 20 | 74.1 | 4.4 | 4.8 | 13.8 | 1.5 | 97.5 | 67.5 |
| 4 | 40 | 67.5 | 2.0 | 3.1 | 6.5 | 1.4 | 95.8 | 63.8 |

$^a$General conditions: [1]:[2]:[PO] = 1:2:2000, t = 15 min, $T_{rxn}$ = 20° C., [PO] = 2M in toluene.
$^b$Determined by $^1$H NMR spectroscopy.
$^c$Determined by gel-permeation chromatography calibrated with polystyrene standards in CHCl$_3$ at 40° C.
$^d$Isotactic mm triad content determined by $^{13}$C NMR spectroscopy.
$^e$Determined by differential scanning calorimetry.

Screening of Chain Transfer Agents. In order to synthesize telechelic PPO diols, the use of water as a diprotic CTA was explored. Unfortunately, the addition of 10 eq. of water relative to 1 resulted in a complete loss of polymerization activity for PO. Water or the glycol product from addition of water to PO chelated inside the catalyst cleft and blocked coordination of monomer was hypothesized. Instead, the polymerization of mono-alcohols was explored with the goal of using a post-polymerization modification to synthesize the desired PPO diols. Addition of the sterically bulky alcohol trimethylsilanol did not lower polymer MW presumably due to its inability to enter the catalyst cleft.

4-methoxybenzyl alcohol (PMB) as a CTA with the goal of oxidatively cleaving the benzyl ether to yield an alcohol via post-polymerization modification was screemed. As shown in Table 4 MWs decreased with additional PMB and the samples were highly isotactic. PMB initiation was confirmed by the 1:1 stoichiometry of the PMB initiator and alcohol methine terminus resonances detected by $^1$H NMR spectroscopy. The samples were oxidatively deprotected using 2,3-dichloro-5,6-dicyanobenzoquinone (DDQ) to give the desired PPO diols. Despite the oxidative instability of polyethers, the reaction conditions were mild enough that MW values were consistent before and after deprotections showing that the oxidation selectively cleaved only the PMB group. $^1$H and $^{13}$C NMR spectroscopy as well as MALDI-MS confirmed the removal of PMB groups to give telechelic isotactic PPO diols. After purification with acetone all samples were isolated as white powders, displayed high mm values and were crystalline with high melting points consistent with pure isotactic PPO.

TABLE 4

Polymerization of rac-PO Using Catalyst System 1/2 and PMB, Followed by Deprotection with DDQ$^a$

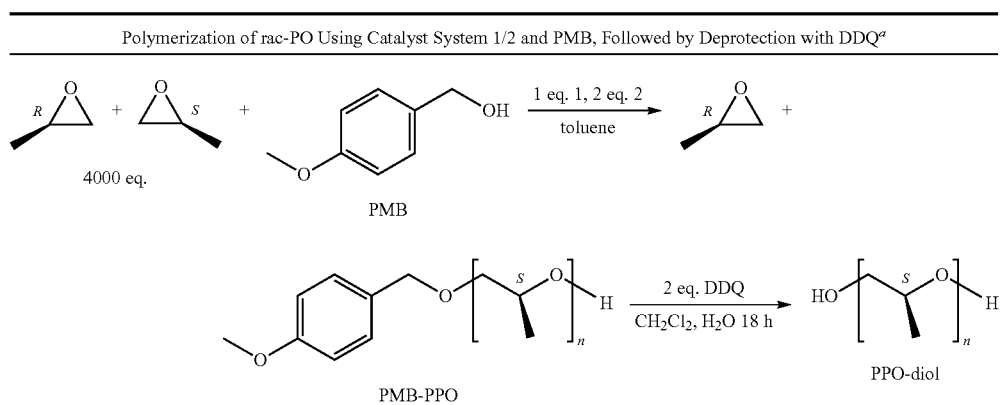

| | | | | | Synthesis of PMB-PPO | | | | Synthesis of PPO-diol | | | | |
|---|---|---|---|---|---|---|---|---|---|---|---|---|---|
| entry | CTA eq. | conv. (%) | $M_n^{Theo}$ (kg/mol) | $M_n^{NMR}$ (kg/mol)$^b$ | $M_n^{GPC}$ (kg/mol)$^c$ | $M_w/M_n^c$ | [mm] (%)$^d$ | yield (%) | $M_n^{NMR}$ (kg/mol)$^b$ | $M_n^{GPC}$ (kg/mol)$^c$ | $M_w/M_n^c$ | [mm] (%)$^d$ | $T_m$ (°C.)$^e$ |
| 1 | 10 | 51.9 | 12.3 | 22.8 | 31.7 | 2.1 | 96.4 | 68.2 | 13.3 | 36.6 | 2.1 | 97.0 | 68.5 |
| 2 | 20 | 52.5 | 6.2 | 7.8 | 17.9 | 2.0 | 95.9 | 84.0 | 9.8 | 17.4 | 1.9 | 97.0 | 67.5 |
| 3 | 40 | 52.9 | 3.1 | 3.6 | 9.1 | 1.9 | 96.3 | 75.7 | 3.1 | 10.8 | 1.8 | 97.3 | 67.1 |
| 4 | 80 | 54.9 | 1.6 | 1.9 | 5.4 | 1.7 | 96.4 | 80.8 | 1.9 | 5.9 | 2.0 | 97.8 | 65.6 |

$^a$General conditions: [1]:[2]:[PO] = 1:2:4000, t = 1 h, $T_{rxn}$ = 20° C., [PO] = 2M in toluene.
$^b$Determined by $^1$H NMR spectroscopy.
$^c$Determined by gel-permeation chromatography calibrated with polystyrene standards in CHCl$_3$ at 40° C.
$^d$Isotactic mm triad content determined by $^{13}$C NMR spectroscopy.
$^e$Determined by differential scanning calorimetry.

Diols as Chain Transfer Agents. A more direct synthetic route to PPO diols was sought to avoid post-polymerization modifications. In order to minimize chelation, the use of polymeric diols as CTAs to synthesize telechelic isotactic PPO was explored. The addition of poly(1-butene)diol as a CTA (Table 5) lowered MWs and did not drastically reduce conversion to polymer. All products were highly isotactic and crystalline. As shown in Table 5 addition of PO shifted the original poly(1-butene)diol trace to higher MW suggesting the addition of PPO end blocks. NMR spectroscopy verified the disappearance of poly(1-butene) end-groups and appearance of new PPO terminal methine alcohol end-groups consistent with the formation of block copolymers.

TABLE 5

Polymerization of rac-PO
Using Catalyst System 1/2 and Poly(1-butene) Diol[a]

| entry | CTA eq. | conv. (%) | $M_n^{GPC}$ (kg/mol)[b] | $M_w/M_n^b$ | [mm] (%)[c] | $T_m$ (° C.)[d] | $\Delta H_f$ (J/g)[d] |
|---|---|---|---|---|---|---|---|
| 1 | 0 | 49.5 | 231 | 2.9 | 96.4 | 66.2 | −43.8 |
| 2 | 10 | 50.4 | 28.3 | 1.7 | 94.8 | 67.2 | −42.9 |
| 3 | 20 | 49.9 | 14.4 | 1.7 | 95.8 | 65.8 | −41.9 |
| 4 | 40 | 32.4 | 7.1 | 1.5 | 99.2 | 64.3 | −23.4 |

[a]General conditions: [1]:[2]:[PO] = 1:2:4000, t = 1 h, $T_{rxn}$ = 20° C., [PO] = 2M in toluene.
[b]Determined by gel-permeation chromatography calibrated with polystyrene standards in CHCl$_3$ at 40° C.
[c]Isotactic mm triad content determined by $^{13}$C NMR spectroscopy.
[d]Determined by differential scanning calorimetry.

In order to maximize the PPO content of the polymeric diols, small molecule diols with alkyl spacers were explored as CTAs. Addition of 1,8-octanediol, or 1,6-hexanediol lowered MWs and did not impact conversion as shown in Table 6. All samples were highly isotactic with high mm values and melting points. PPO alcohol methine end-groups could be seen by $^1$H (δ=3.91 ppm) and $^{13}$C (δ=65.60 ppm) NMR spectroscopy and integrated cleanly with the alkyl mid-sections, showing that aliphatic diols can be used with 1/2 to directly synthesize isotactic telechelic PPO diols from racemic PO.

TABLE 6

Polymerization of rac-PO
Using Catalyst System 1/2 and 1,6-Hexanediol[a]

| entry | CTA eq. | conv. (%) | $M_n^{Theo}$ (kg/mol) | $M_n^{NMR}$ (kg/mol)[b] | $M_n^{GPC}$ (kg/mol)[c] | $M_w/M_n^c$ | [mm] (%)[d] | $T_m$ (° C.)[e] |
|---|---|---|---|---|---|---|---|---|
| 1 | 0 | 49.5 | 120 | — | 231 | 2.9 | 96.4 | 66.2 |
| 2 | 10 | 52.4 | 12.4 | 17.6 | 39.0 | 1.9 | 95.8 | 67.6 |
| 3 | 20 | 54.3 | 6.4 | 9.5 | 22.5 | 1.9 | 95.8 | 66.3 |
| 4 | 40 | 50.3 | 3.0 | 3.7 | 11.9 | 2.0 | 96.7 | 64.6 |
| 5 | 80 | 45.6 | 1.4 | 2.2 | 6.1 | 1.8 | 97.6 | 60.6 |

[a]General conditions: [1]:[2]:[PO] = 1:2:4000, t = 1 h, $T_{rxn}$ = 20° C., [PO] = 2M in toluene.
[b]Determined by $^1$H NMR spectroscopy.
[c]Determined by gel-permeation chromatography calibrated with polystyrene standards in CHCl$_3$ at 40° C.
[d]Isotactic mm triad content determined by $^{13}$C NMR spectroscopy.
[e]Determined by differential scanning calorimetry.

MALDI-MS Analysis of Polymers. Low MW samples were analyzed by MALDI-MS to confirm identity of end-groups. Representative data (Table 6, entry 5) is shown in (Table 6, entry 5). The major series consists of ions 58 mass units apart, with the remaining mass being accounted for by the cationization agent sodium and the end-group/initiator hexane diol. Two smaller series are also observed with a spacing of 58 mass units apart, one corresponds to the potassium adduct of the desired diol while the other has mass 18 u lower than the major series suggesting that a dehydrated polymer is present in small amounts. Molecular weights determined by MALDI-MS (2.1 kg/mol) matched closely with those determined by $^1$H NMR spectroscopy (2.2 kg/mol).

Conclusions. The addition of alcohols to rac-PO polymerizations using system 1/2 allows the synthesis of isotactic PPO with controlled MWs and alcohol end-groups. Studies with rac-1/2 demonstrate that the catalyst can propagate from both enantiomers of chiral alcohols and the rate of propagation is higher than chain transfer allowing for the synthesis of iso-stereoblock PPO. All PPO samples synthesized were highly tactic and crystalline. PPO diols were synthesized via the oxidative deprotection of PMB terminated PPO and also by using alkyl diols as CTAs.

Isotactic poly(propylene oxide) was synthesized from racemic propylene oxide using an enantioselective catalyst. Control of molecular weight and end-groups were achieved by addition of alcohols. Telechelic isotactic diols were attained via post-polymerization modification or by addition of diols as chain transfer agents to the polymerization system.

EXAMPLE 2

This example provides syntheses of polyethers using both monoalcohol CTAs and multifunctional CTAs.

General Considerations. All manipulations of air or water sensitive compounds were carried out under dry nitrogen using a Braun Labmaster drybox or standard Schlenk line techniques. NMR spectra were recorded on Varian INOVA 400 ($^1$H, 400 MHz), or Varian INOVA 600 ($^1$H, 600 MHz) spectrometers. $^1$H NMR spectra were referenced with residual solvent shifts (CHCl$_3$=7.26 ppm). $^{13}$C NMR spectra were referenced by solvent shifts (CDCl$_3$=77.16 ppm).

Materials. HPLC grade methylene chloride and toluene were purchased from Fisher Scientific and purified over solvent columns. Propylene oxide (PO) purchased from Aldrich and dried over calcium hydride, degassed through several freeze-pump-thaw cycles, vacuum transferred and stored under nitrogen in a glovebox. Dimethoxyethane (DME) was distilled off of sodium metal after freeze-pump-thawing. (1R, 2R)- and (1S,2S)-Diaminocyclohexane (99% ee) were purchased from Aldrich, and (S)- and (R)-1,1'-bi-2-naphthol were purchased from TCI. Complex 1, (S)- and (R)-3,3'-Diformyl-1,1'-bi-2-naphthol as well as bis(triphenylphosphine)iminium pivalate ([PPN]OPiv, 2) were prepared according to literature procedures. Alcohols were purchased from Aldrich and dried over activated 3 Å molecular sieves. Poly(1-butene)diol ($M_n$=3 kg/mol) was purchased from Nisso and dried under vacuum overnight. All other reagents were purchased from commercial sources and used as received.

Polymer Characterization and NMR Quantification of Polymer Tacticity, Enantiomeric Excess and s-factor. Number average molecular weights ($M_n^{GPC}$) and molecular weight distributions ($M_w/M_n$) were measured by gel-permeation chromatography (GPC) at 40° C. in chloroform using a Waters instrument, (M515 pump, 717+Autosampler) equipped with a Waters UV486 and Waters 2410 differential refractive index detectors, and three 5 μm PSS SDV columns (Polymer Standards Service; 50 Å, 500 Å, and Linear M porosities) in series. The GPC columns were eluted with chloroform at 1 mL/min and were calibrated with monodisperse polystyrene standards. Number average molecular weights ($M_n^{NMR}$) were determined by $^1$H NMR spectroscopy with a relaxation delay of 60 seconds using the relative integrations of the terminal methine (δ=3.89 ppm) compared to the polymeric methine (δ=3.39 ppm). Polymer melting points ($T_m$) were measured by differential scanning calorimetry (DSC) using a Mettler Toledo Polymer DSC calorimeter equipped with an automated sampler. Analyses were performed in crimped aluminum pans under nitrogen and data were collected from the second heating run at a heating rate of 10° C./min from −70 to 200° C., and processed with StarE system software. Polymer tacticity was characterized by $^{13}$C NMR as previously reported. End-groups were previously reported or assigned by reference compounds. Polymer enantiomeric excess was calculated using: $ee_{(p)}$=(2[mm]+[mr][rm]−1)$^{1/2}$, selectivity (s-factor) was calculated using: s=s-factor=$k_S/k_R$=ln [1−c(1+$ee_{(P)}$)]/ln [1−c(1−$ee_{(p)}$)] where c is conversion. Polymer masses and subsequent conversions were corrected by removing the mass of catalyst and CTA.

MALDI-TOF-MS Analysis. MALDI-MS analysis was performed on a Bruker Biflex. The polymer samples were dissolved in THF at a concentration 5 mg/mL. The matrix used was CHCA (α-Cyano-4-hydroxycinnamic acid) dissolved in THF at a concentration of 0.25 $M_n$ Solutions of matrix, and polymer were mixed in a volume ratio of 10:1, respectively. The spectra were recorded in positive ion reflectron mode.

Polymerization Procedures and Additional Tables. Representative Polymerization: Synthesis of iPrO-PPO. In a drybox under nitrogen atmosphere, 1 (4.0 mg, 3.5 μmol), and co-catalyst [PPN]OPiv (2, 4.5 mg, 7.0 μmol) were added to a reactor vial containing a stir bar and 6 mL toluene. The vial was sealed and removed from the glove box. Using Schlenck line techniques 140 μL of 1 M isopropanol in toluene was added. PO (0.846 g, 14.3 mmol) was then added via syringe with rapid stirring. After 4 minutes all volatiles were quickly removed under vacuum. The product was dried overnight. Conversion was determined gravimetrically (0.417 g, 49.2%). A concentrated sample of polymer (50 mg in 0.7 mL of CDCl$_3$) was analyzed using $^{13}$C NMR spectroscopy to determine polymer tacticity. $^1$H NMR (CDCl$_3$, 600 MHz): δ 3.91 (m, 1H), 3.56-3.49 (m, 106H), 3.39 (m, 53H), 1.11 (d, J=5.5 Hz, 159H). $^{13}$C {$^1$H} NMR (CDCl$_3$, 150 MHz): δ 75.64, 73.61, 65.60, 22.25, 22.10, 17.64. $M_n^{GPC}$=6.0 kg/mol, $M_w/M_n$=1.8.

Synthesis of 1-methoxy-2-propanol-PPO. The standard procedure was followed, but added 280 μL of 1 M (S)-1-methoxy-2-propanol in DME as CTA. Volatiles were quickly removed after 1 hour, and conversion was determined gravimetrically (0.435 g, 51.8%). $^1$H NMR (CDCl$_3$, 600 MHz): δ 3.91 (m, 1H), 3.56-3.49 (m, 50H), 3.39 (m, 25H), 3.34 (s, 3H), 1.11 (d, J=5.5 Hz, 75H). 13C {$^1$H} NMR (CDCl3, 150 MHz): δ 75.64, 75.11, 67.40, 65.60, 59.27, 17.64. MnGPC=3.3 kg/mol, Mw/Mn=1.2.

Synthesis of PMB-PPO. The standard procedure was followed, but used 280 μL of 1 M 4-methoxybenzyl alcohol in dimethoxyethane (DME) as CTA. After 1 hour all volatiles were quickly removed under vacuum. Conversion was determined gravimetrically (0.465 g, 54.9%). $^1$H NMR (CDCl$_3$, 600 MHz): δ 7.24 (d, J=8.2 Hz, 2H), 6.85 (d, J=8.2 Hz, 2H), 4.49-4.43 (m, 2H), 3.91 (m, 1H), 3.78 (s, 3H), 3.56-3.49 (m, 66H), 3.39 (m, 33H), 1.11 (d, J=5.5 Hz, 99H). $^{13}$C {$^1$H} NMR (CDCl$_3$, 150 MHz): δ 159.21, 130.59, 129.28, 113.81, 75.64, 73.61, 67.40, 65.60, 55.36, 17.64. $M_n^{GPC}$=5.4 kg/mol, $M_w/M_n$=1.7.

PPO-b-poly(1-butene)-b-PPO. The standard procedure was followed, but 416 mg poly(1-butene)diol ($M_n$=3 kg/mol) was dissolved in 6 mL toluene and used as solvent. After 1 hour all volatiles were quickly removed under vacuum, and conversion was determined gravimetrically (269 mg, 32.4%). $^1$H NMR (CDCl$_3$, 600 MHz): δ 3.91 (m, 2H), 3.56-3.49 (m, 66H), 3.39 (m, 33H), 1.43-0.91 (m, 185H), 1.11 (d, J=5.5 Hz, 99H), 0.88-0.77 (m, 111H). $^{13}$C {$^1$H} NMR (CDCl$_3$, 150 MHz): δ 75.70, 73.61, 65.60, 39.41-38.40, 36.19, 33.97-33.29, 30.81-29.58, 27.00-25.78, 10.99-10.10, 17.64. $M_n^{GPC}$=7.1 kg/mol, $M_w/M_n$=1.5. No signal was obtained by MALDI-MS.

PPO-1,8-octane diol-PPO. The standard procedure was followed, but added 560 μL of 0.5 M 1,8-octane diol in DME as CTA. After 1 hour all volatiles were quickly removed under vacuum, conversion was determined gravimetrically (426 mg, 50.2%). $^1$H NMR (CDCl$_3$, 600 MHz): δ 3.91 (m, 1H), 3.56-3.49 (m, 30H), 3.39 (m, 15H), 1.57-1.50 (m, 2H), 1.32-1.25 (m, 4H), 1.11 (d, J=5.5 Hz, 45H). $^{13}$C {$^1$H} NMR (CDCl$_3$, 150 MHz): δ 75.64, 75.30, 73.61, 67.40, 65.60, 29.56, 26.20, 17.64. $M_n$=3.6 kg/mol, $M_w/M_n$=1.5.

TABLE 7

Polymerization of rac-PO
Using Catalyst System 1/2 and 1,8-Octanediol$^a$

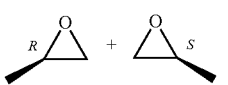

4000 eq.

TABLE 7-continued

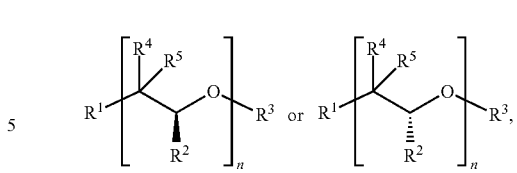

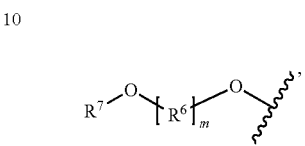

| entry | CTA eq. | conv. (%) | $M_n^{Theo}$ (kg/mol)[a] | $M_n^{NMR}$ (kg/mol)[b] | $M_n^{GPC}$ (kg/mol)[c] | $M_w/M_n$[c] | [mm] (%)[d] | $T_m$ (° C.)[e] |
|---|---|---|---|---|---|---|---|---|
| 1 | 0 | 49.5 | 120 | — | 213 | 2.9 | 96.4 | 66.2 |
| 2 | 10 | 54.3 | 12.9 | 12.2 | 33.2 | 2.0 | 95.2 | 70.0 |
| 3 | 20 | 55.9 | 6.6 | 8.1 | 15.5 | 2.3 | 95.7 | 70.7 |
| 4 | 40 | 55.4 | 3.3 | 4.0 | 8.5 | 2.1 | 96.6 | 68.2 |
| 5 | 80 | 50.2 | 1.5 | 1.8 | 3.6 | 1.5 | 97.5 | 58.4 |

[a]General conditions: [1]:[2]:[PO] = 1:2:4000, t = 1 h, $T_{rxn}$ = 20° C., [PO] = 2M in toluene.
[b]Determined by $^1$H NMR spectroscopy.
[c]Determined by gel-permeation chromatography calibrated with polystyrene standards in CHCl$_3$ at 40° C.
[d]Isotactic mm triad content determined by $^{13}$C NMR spectroscopy.
[e]Determined by differential scanning calorimetry.

PPO-1,6-hexane diol-PPO. The standard procedure was followed, but 280 μL of 1 M 1,6-hexane diol in DME was added as CTA. After 1 hour all volatiles were quickly removed under vacuum, and conversion was determined gravimetrically (383 mg, 45.6%). $^1$H NMR (CDCl$_3$, 600 MHz): δ 3.91 (m, 1H), 3.56-3.49 (m, 38H), 3.39 (m, 19H), 1.60-1.50 (m, 2H), 1.37-1.30 (m, 2H), 1.11 (d, J=5.5 Hz, 57H). $^{13}$C {$^1$H} NMR (CDCl$_3$, 150 MHz): δ 75.64, 75.29, 73.61, 67.40, 65.60, 29.50, 26.09, 17.64. $M_n^{GPC}$=6.1 kg/mol, $M_w/M_n$=1.8.

Oxidative Synthesis of PPO Diol. PMB-PPO (415 mg) was dissolved in methylene chloride (10 mL). To this solution was added 1 mL water and 126 mg DDQ. Vial was sealed and stirred rapidly at 20° C. for 16 hours then extracted with 2×10 mL water and concentrated on vacuum line. The crude solid was crystallized from 5 mL hot acetone with cooling at −78° C., and rinsed with 2×5 mL −78° C. acetone. Product isolated by filtration as white solid. Yield: 376 mg, 80.8%. $^1$H NMR (CDCl$_3$, 600 MHz): δ 3.91 (m, 1H), 3.56-3.49 (m, 66H), 3.39 (m, 33H), 1.11 (d, J=5.5 Hz, 99H). $^{13}$C {$^1$H} NMR (CDCl$_3$, 150 MHz): δ 75.64, 73.61, 67.40, 65.60, 17.64. $M_n^{GPC}$=5.9 kg/mol, $M_w/M_n$=2.0.

While the invention has been particularly shown and described with reference to specific embodiments (some of which are preferred embodiments), it should be understood by those having skill in the art that various changes in form and detail may be made therein without departing from the spirit and scope of the present invention as disclosed herein.

What is claimed is:

1. A polymer having the following structure:

$$CTG \longrightarrow (PE)_i,$$

wherein CTG is a chain transfer group and PE is an isotactic polyether group, and i is from 1 to 10, and
wherein the mm-triad content of the polymer is greater than 75% and the $M_n$ of the polymer is from 1,000 to 40,000 g/mol.

2. The polymer of claim 1, wherein the polymer has the following structure:

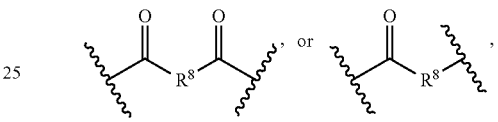

where $R^1$ is

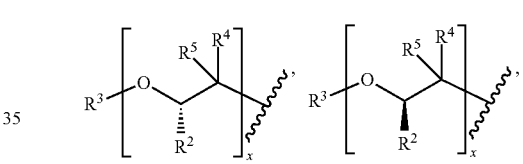

$R^2$ is H or $C_1$ to $C_{20}$ aliphatic group, $R^3$ is H or $C_1$ to $C_{20}$ aliphatic group, $R^4$ is H or a $C_1$ to $C_{20}$ aliphatic group, $R^5$ is H or a $C_1$ to $C_{20}$ aliphatic group, $R^6$ is $C_2$ to $C_{20}$ aliphatic group, $C_3$ to $C_{20}$ carbocyclic group, $C_6$ to $C_{24}$ aryl group,

[structures shown]

$R^7$ is H,

[structures shown]

or $C_1$ to $C_{20}$ aliphatic group, $R^8$ is absent or $C_1$ to $C_{20}$ aliphatic group, n is from 5 to 500, m is from 1 to 500, and x is from 5 to 500,
wherein, optionally, any two of $R^4$, $R^5$, and $R^2$ taken together can form with their intervening atoms can form one or more rings selected from the group consisting of: $C_3$ to $C_{14}$ carbocyclic group, $C_3$ to $C_{14}$ heterocyclic group, $C_6$ to $C_{10}$ aryl group, and $C_5$ to $C_{10}$ heteroaryl group.

3. The polymer of claim 1, wherein the chain transfer group is a diol chain transfer group, a diacid chain transfer group, or a hydroxyacid chain transfer group.

4. The polymer of claim 1, wherein the $M_n$ of the polymer is from 1,000 to 30,000 g/mol, 1,000 to 15,000 g/mol, or 1,000 to 12,000 g/mol.

5. The polymer of claim 1, wherein the polymer has a mm-triad content is greater than 80%, 85%, 90%, 91%, 92%, 95%, 96%, 97%, 98%, or 99%.

6. The polymer of claim 1, wherein the PDI of the polymer is less than 2.

7. The polymer of claim 1, wherein the polymer is polypropylene oxide.

8. A method for making a polymer having the structure of claim 1 comprising the steps of: polymerizing an epoxide in the presence of a catalyst, an ionic co-catalyst, and a monoalcohol chain transfer agent or multifunctional chain transfer agent.

9. The method of claim 8, wherein the monoalcohol chain transfer agent is methanol, ethanol, i-propanol, benzyl alcohol, p-methoxybenzyl alcohol, or has the following structure:

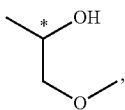

wherein * denotes a chiral carbon center.

10. The method of claim 8, wherein the multifunctional chain transfer agent is $R^{16}$—$(COOH/OH)_z$, wherein $R^{16}$ is $C_1$ to $C_{20}$ aliphatic group, or $C_1$ to $C_{20}$ carbocyclic group, and z is from 1 to 10.

11. The method of claim 8, wherein the multifunctional chain transfer agent is

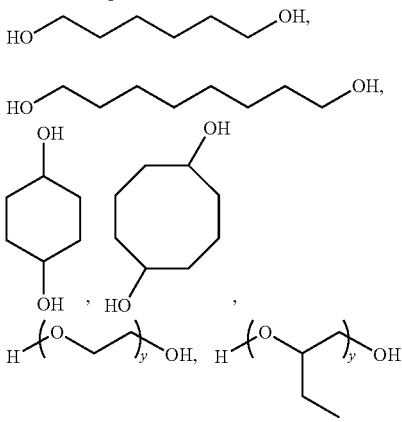

sugars, polysaccharides, glycerols, or hydroxyl or carboxyl functional polymers.

12. The method of claim 8, wherein the epoxide is chiral or racemic.

13. The method of claim 8, wherein the epoxide, catalyst, ionic co-catalyst, and monoalcohol chain transfer agent or multifunctional chain transfer agent are contacted in a solvent.

14. The method of claim 8, wherein the catalyst is:

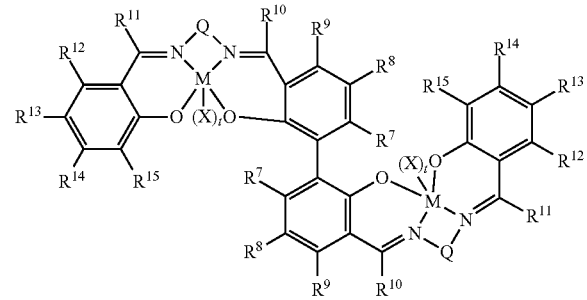

M is a metal, X is a nucleophile or counterion, t is an integer from 0 to 2, Q is $C_1$ to $C_{20}$ aliphatic group, $C_5$ to $C_{20}$ cycloalkyl group, and each $R^9$ through $R^{17}$ independently are selected from the group consisting of hydrogen, $C_1$ to $C_{20}$ aliphatic group, halide, $C_1$ to $C_{20}$ alkoxide group, and $C_6$ to $C_{20}$ aryl group, wherein, optionally, adjacent $R^9$, $R^{10}$, $R^{11}$, $R^{12}$, $R^{13}$, $R^{14}$, $R^{15}$, $R^{16}$, or $R^{17}$ groups taken together with their intervening atoms to form a saturated, partially unsaturated, or aromatic 5 to 12 membered ring containing 0 to 4 heteroatoms, 5 to 6 membered carbocyclic group, aryl group, or 5 to 7-membered heteroaryl group, wherein the rings or groups are substituted, and the catalyst is racemic or chiral.

15. The method of claim 14, wherein the catalyst is selected from the group consisting of:

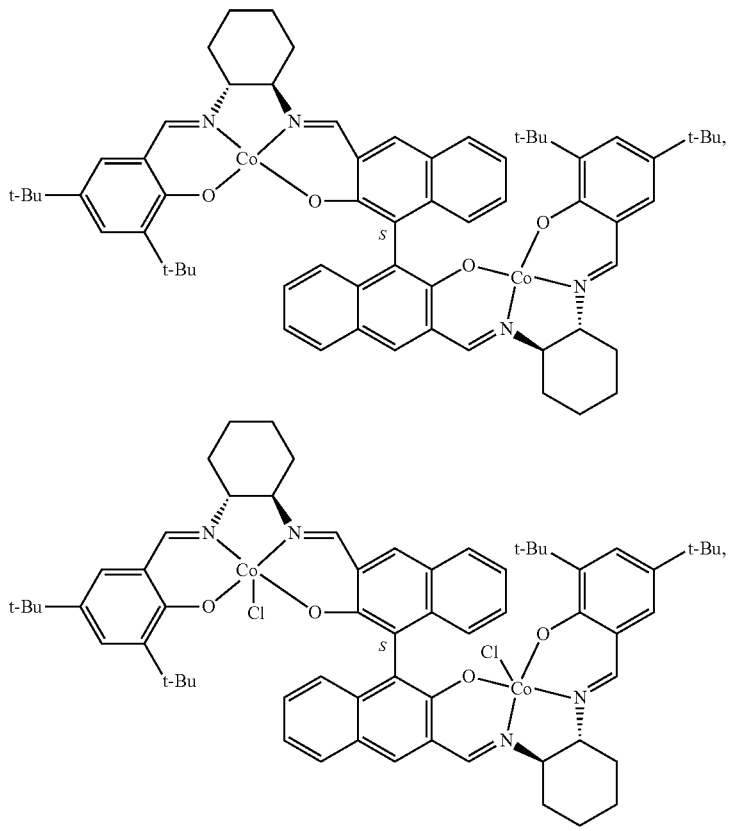

-continued
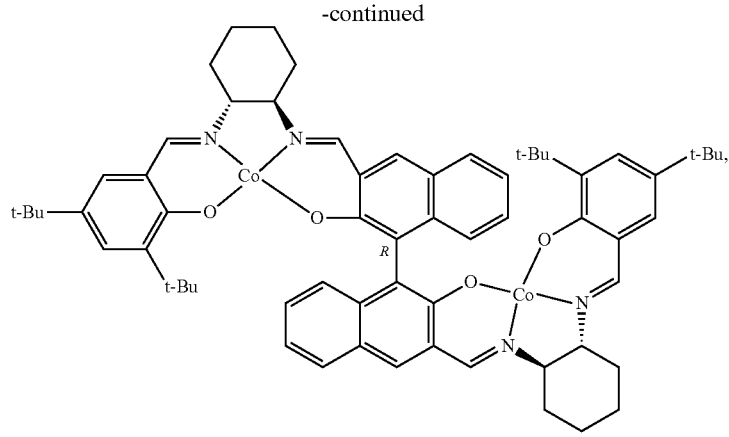
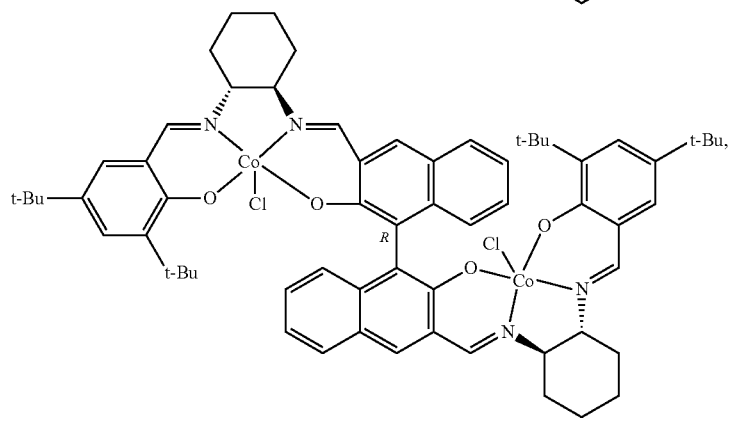
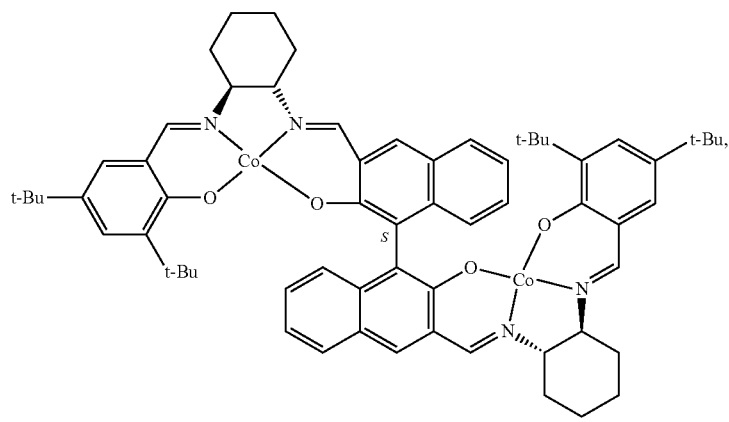
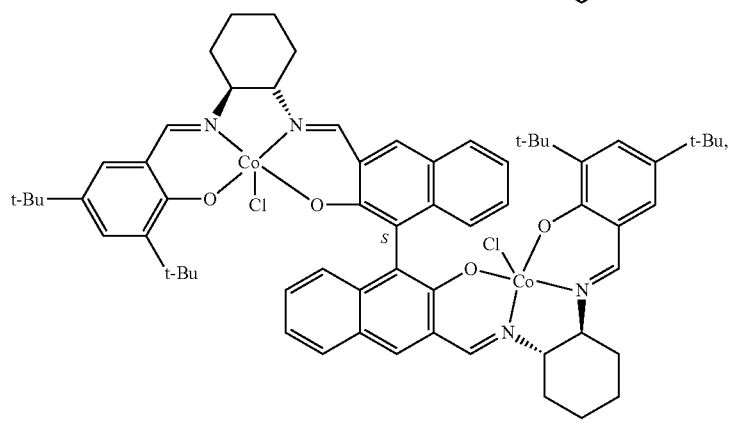

-continued

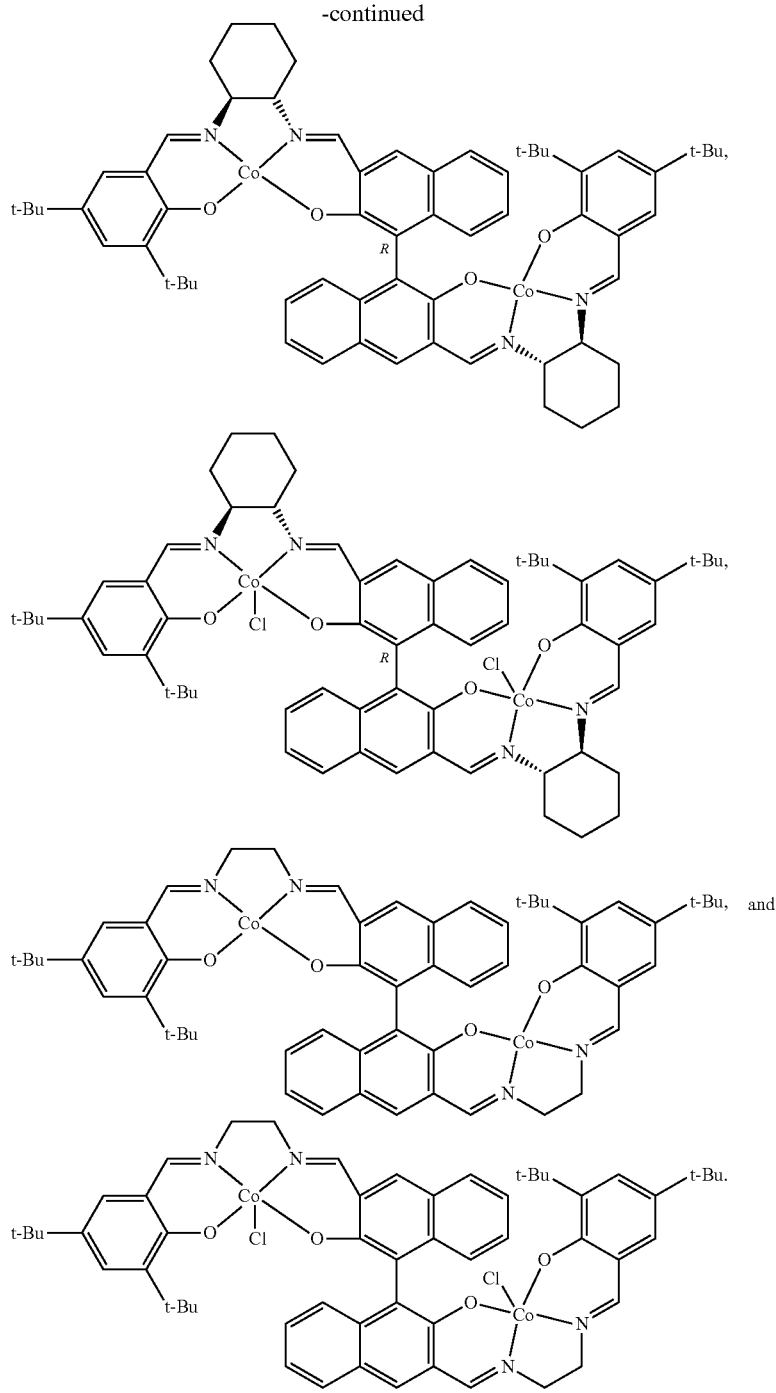

16. The method of claim 8, wherein the ionic co-catalyst is PPNOPiv.

17. A material comprising the polymer of claim 1.

18. The material of claim 17, wherein the material is a polyurethane, elastomer, thermoset plastic, or thermoplastic.

19. The polymer of claim 1, wherein the $M_n$ of the polymer is from 1,000 to 8,000 g/mol and the melting point of the polymer is 58° C. or greater.

20. The polymer of claim 1, wherein the $M_n$ of the polymer is from 1,000 to 8,000 g/mol and the melting point of the polymer is 58° C. to 71° C.

* * * * *